(12) United States Patent
Tsuruta et al.

(10) Patent No.: US 8,140,858 B2
(45) Date of Patent: Mar. 20, 2012

(54) DATA PROCESSING APPARATUS

(75) Inventors: Hirokazu Tsuruta, Itami (JP); Atsuo Yamaguchi, Tokyo (JP); Shigenori Miyauchi, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 462 days.

(21) Appl. No.: 12/401,427

(22) Filed: Mar. 10, 2009

(65) Prior Publication Data
US 2009/0259856 A1 Oct. 15, 2009

(30) Foreign Application Priority Data
Apr. 10, 2008 (JP) .................... 2008-102392

(51) Int. Cl.
*G06F 21/00* (2006.01)
(52) U.S. Cl. ......... 713/190; 713/189; 713/188; 713/187
(58) Field of Classification Search .................. None
See application file for complete search history.

(56) References Cited

U.S. PATENT DOCUMENTS

| | | | |
|---|---|---|---|
| 5,675,645 A * | 10/1997 | Schwartz et al. | 713/187 |
| 2002/0169969 A1 * | 11/2002 | Watanabe et al. | 713/190 |
| 2006/0031686 A1 * | 2/2006 | Atallah et al. | 713/190 |
| 2008/0022130 A1 * | 1/2008 | Amschler et al. | 713/190 |
| 2008/0148061 A1 * | 6/2008 | Jin et al. | 713/187 |

FOREIGN PATENT DOCUMENTS

| | | |
|---|---|---|
| JP | 2005-166070 | 6/2005 |
| JP | 2007-131107 | 5/2007 |
| JP | 2008-287449 | 11/2008 |

OTHER PUBLICATIONS

Zhuang et al. Using Branch Correlation to Identify Infeasible Path for Anomaly Detection, 2006, The 39th Annual IEEE/ACM International Symposium on Microarchitecture (MICRO'06) 0-7695-2732-9/06.*
Fiskiran et al. Runtime Execution Monitoring (REM) to Detect and Prevent Malicious Code Executiom, 2004, Proceedings of the IEEE International Conference on Computer Design (ICCD'04) 1063-6404/04.*

* cited by examiner

*Primary Examiner* — Kaveh Abrishamkar
*Assistant Examiner* — Adrian Stoica
(74) *Attorney, Agent, or Firm* — McDermott Will & Emery LLP

(57) ABSTRACT

A data processing apparatus is provided, which detects falsification of software to data and rewriting of the data. The data processing apparatus according to an embodiment of the present invention comprises a security unit which has an encryption circuit for decrypting an encrypted signal including secrecy data. The security unit includes a compression circuit which compresses an access signal used in accessing the security unit and outputs the compression result, and a comparison circuit which compares the compression result outputted from the compression circuit with a previously-calculated expectation value of the compression result of the access signal.

9 Claims, 19 Drawing Sheets

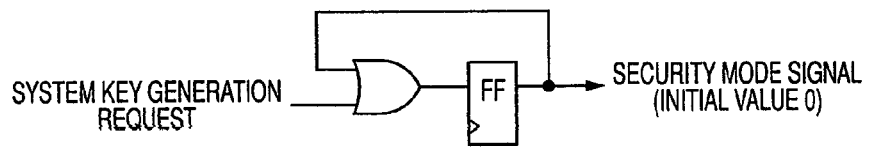
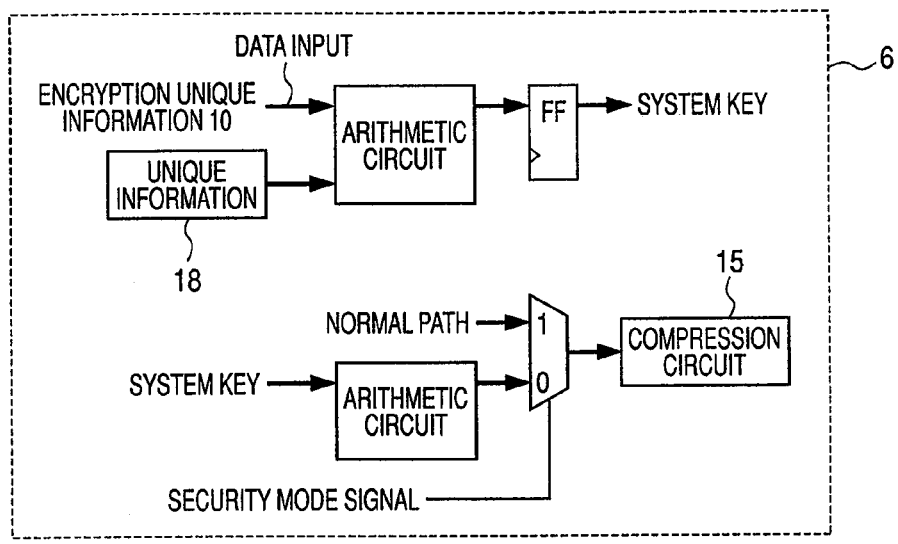
FIG. 11
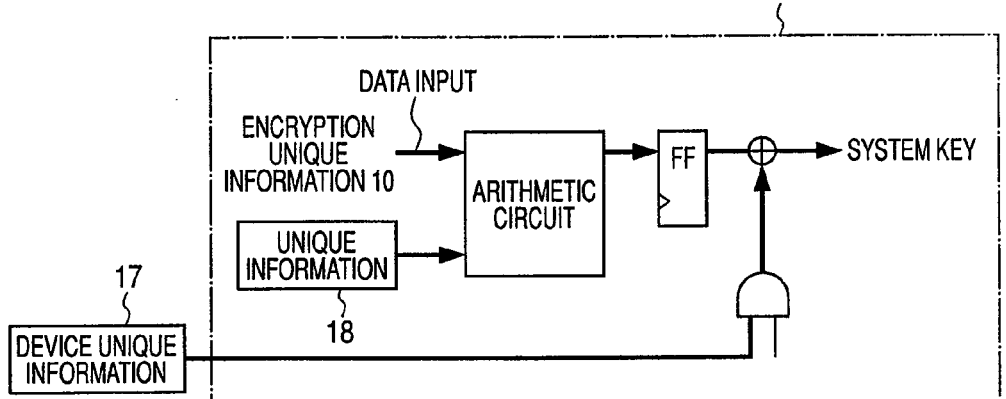
FIG. 12

DATA PROCESSING APPARATUS

CROSS-REFERENCE TO RELATED APPLICATIONS

The disclosure of Japanese Patent Application No. 2008-102392 filed on Apr. 10, 2008 including the specification, drawings and abstract is incorporated herein by reference in its entirety.

BACKGROUND OF THE INVENTION

The present invention relates to a data processing apparatus capable of safely managing data which is valuable from a financial point of view, such as an image, music data, and personal information.

With development of semiconductor technology in recent years, digitization of data is advancing rapidly, in the music data from a record to CD (Compact Disc), and in movie data from video to DVD (Digital Versatile Disc). Digital data, such as copyrighted data and personal information, has an advantage for a producer or a purchaser in that quality degradation does not occur by copying; on the other hand, the digital data has a disadvantage, such as the decrease in a quantity sold due to illegal copies and the leakage of the personal information to many and unspecified persons. In this way, it is desirable to establish a kind of mechanism in which only those who are permitted can use digital contents.

In order to protect digital contents and the valuable data in communication, finance, etc. from a malicious third party, encryption technology is used positively. The encryption technology has realized the authentication function to confirm whether a user is permitted to use contents, as well as the function of data encryption and decryption to enable only those who are permitted to use the contents. Processing systems of digital contents, etc. are realized by implementing such an encryption technology into a semiconductor product.

In a digital contents processing system in the past, authentication is performed among a device which outputs encrypted contents, such as a DVD drive, a contents processing unit, and contents recording medium. When it is confirmed that authenticating processing is just, the encrypted contents are transmitted to the contents processing unit from the contents recording medium. In order to decrypt the encrypted contents, a key is necessary. The key is generated by calculation from the information necessary for generation of the key and unique information in the contents recording medium. The unique information, temporary data, and a key (the temporary data and the key being generated in the calculation process of a contents decryption key) are required to be of secrecy, since the encrypted contents can be unjustly decrypted by obtaining these items unjustly.

In this way, in order that the contents may not be used unjustly by a malicious third party, it is necessary to provide a security protection area in the contents processing unit. However, in the case where a malicious third party can have a certain influence to the security protection area, neither the secrecy of contents nor the authentication result with respect to a drive is necessarily secured when authentication and decoding of contents are performed. For example, since the contents processing unit is controlled by CPU (Central Processing Unit) by executing the software, falsification of the authentication result and unjust acquisition of the unique information become easily performed by coupling a debugger. When such an unjust access becomes feasible, it is possible to nullify the authentication etc. by sending data directly to a security protection area. Therefore, in such a contents processing system, it is necessary to provide configuration which prevents unjust access to the function in the security protection area from the exterior. To be specific, it is necessary to devise measures such as integrating the function in the security protection area into a single chip, thereby disenabling the coupling of a debugger to CPU and the unjust writing/reading of data from the exterior.

In the past, the following measures are disclosed: that is, a data processor calculates the sum value to instructions included in every predetermined section of an instruction flow, and when the sum value obtained by the last operation and the sum value obtained by the present operation disagree in the same section, the execution of instructions is stopped or the execution sequence of instructions is compulsorily changed (refer to, for example, Document 1 (Japanese unexamined Patent Publication No. 2005-166070)). In addition, an encryption program generating apparatus is proposed, which compresses a branch instruction, a non-branch instruction, and the check sum of the non-branch instruction, which are extracted from a game program, encrypts the compressed data concerned, and stores the encrypted data in a program memory (refer to, for example, Document 2 (Japanese Patent Application No. 131107-2007)).

SUMMARY OF THE INVENTION

The examination by the present inventors has revealed that there arises a problem that, according to the inventions disclosed in the above-described Documents, if a program is altered, the comparison processing to check a sum value is nullified, or if the program itself is not altered but data processed by the program concerned is altered, security protection becomes invalid substantially.

In a contents processing unit in the prior art, a location where a security hole exists is not known, hence, recovery and redesign becomes necessary at the very time when a security hole is found; therefore there arise problems, such as increase of cost and decrease of product reliability.

Since the falsification to the hardware of a security protection area can be performed only by those who have a comparatively expensive device and advanced knowledge, there are few problems that the hardware is altered by a third party. However, the falsification to the software concerning the security processing, such as the falsification of a processing result, is inexpensive, and the effect thereof is also large. In the past, the falsification to software was not able to be detected. Therefore, in order to guarantee the secrecy and justification of data, it was necessary to estimate the problem induced when the control software was altered and to implement a certain means to secure the safety. However, if such a data processor as disclosed by Document 1 is employed, the size of software increases in proportion as the system becomes complicated, and the problem induced by falsification also increases and spreads. Therefore, it is difficult to judge whether countermeasures have been devised against all the problems which might be induced by falsification, and it takes time for the confirmation. When the induced problem is overlooked, it takes time and cost to add and change the hardware whenever the problem occurs. In order to detect falsification, there is a method of using parity and an error correction technology, but there are also many inconveniences, such that falsification can not be detected when a Hamming distance is exceeded greatly and such that the dedicated hardware for performing error detection is necessary.

On the other hand, when storing a secrecy data temporarily, the encryption and signature generation to the data enables detection of falsification of the data by performing the signature verification. However, when there are the encrypted data and the signature which were generated in the past, it is necessary to prevent these items from being replaced secretly by another encrypted data and signature which were generated at another opportunity. Namely, it is desirable to prevent illegal uses, such as rewriting of data. Although the program generating device disclosed by Document 2 could detect that the instruction stored in the program memory had been altered, it was not able to detect the abnormalities of the instruction when the instruction was executed. In this way, since rewriting of data was not able to be detected, the processing was performed with the data which had been rewritten. Therefore, there arises a problem that contents are unjustly reproduced by rewriting of the data. Since occurrence of such a problem changes with situations, it is difficult to prevent all the unjust acts.

The present invention has been made in view of the above circumstances and provides a data processing apparatus which can detect the falsification of software to data and the alteration of data.

In order to solve the above issue, a data processing apparatus according to an embodiment of the present invention includes a security unit having an encryption means which decodes an encrypted signal including secrecy data. The security unit includes a compression means which compresses an access signal to be used in accessing the security unit and outputs the compression result; and a comparison means which compares the compression result outputted by the compression means with a previously-obtained expectation value of the compression result of the access signal.

According to an embodiment of the present invention, the data processing apparatus includes a security unit having an encryption means which decodes an encrypted signal including secrecy data. The security unit includes a compression means which compresses an access signal to be used in accessing the security unit and outputs the compression result; and a comparison means which compares the compression result outputted by the compression means with a previously-obtained expectation value of the compression result of the access signal. Therefore, it is possible to detect the falsification of software to data and the alteration of data.

BRIEF DESCRIPTION OF THE DRAWINGS

FIG. 11 is a drawing illustrating a method of initialization of the compression circuit, according to the embodiment of the present invention;

FIG. 12 is a drawing illustrating copy protection of a non-volatile memory, according to the embodiment of the present invention;

FIG. 16 (B) is an explanatory drawing illustrating the group management code, according to the embodiment of the present invention;

FIG. 18 (B) is a drawing illustrating an example of a state of processing in the security unit, according to the embodiment of the present invention;

FIG. 19 (B) is a drawing illustrating a method to manage plural states in the security unit, according to the embodiment of the present invention;

FIG. 21 (B) is a drawing illustrating common processing shared by plural states, according to the embodiment of the present invention;

FIG. 21 (C) is a drawing illustrating common processing shared by plural states, according to the embodiment of the present invention;

DETAILED DESCRIPTION OF THE PREFERRED EMBODIMENTS

Hereinafter, with reference to the accompanying drawings, the embodiment of the present invention is explained in detail.

Figure 1:
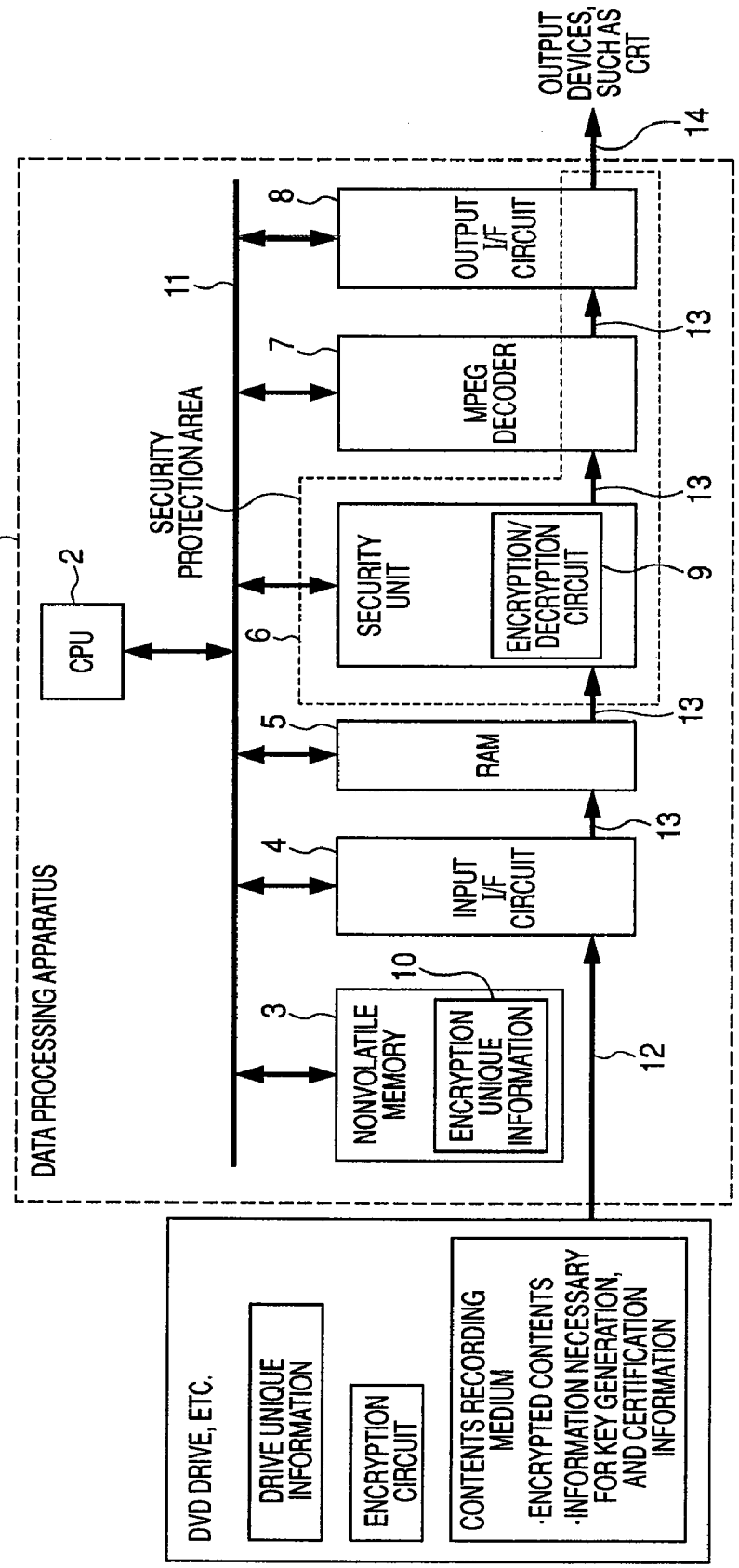
FIG. 1 is a block diagram illustrating a data processing apparatus, according to an embodiment of the present invention.

FIG. 1 illustrates a block diagram of a data processing apparatus 1 according to an embodiment of the present invention. As illustrated in FIG. 1, the data processing apparatus 1 includes: CPU 2 for controlling each function of the data processing apparatus 1; a non-volatile memory 3 for storing data of a program of CPU 2, encryption unique information 10, etc.; an input I/F (interface) circuit 4, such as ATAPI (AT Attachment Packet Interface) for receiving data from a contents recording medium; RAM 5 for storing temporary data of CPU 2 and encrypted contents temporarily; a security unit 6 which has an encryption/decryption circuit 9 (encryption means) for decrypting encrypted signals including secrecy data; an MPEG (Moving Picture Experts Group) decoder 7 for decoding the decrypted contents; and an output I/F circuit 8, such as HDMI (High-Definition Multimedia Interface) for outputting the decrypted contents. In the present embodiment, the area enclosing the security unit 6 in FIG. 1 with a dotted line is defined as a security protection area, which should be protected from an illegal use by a malicious third party.

Figure 2:
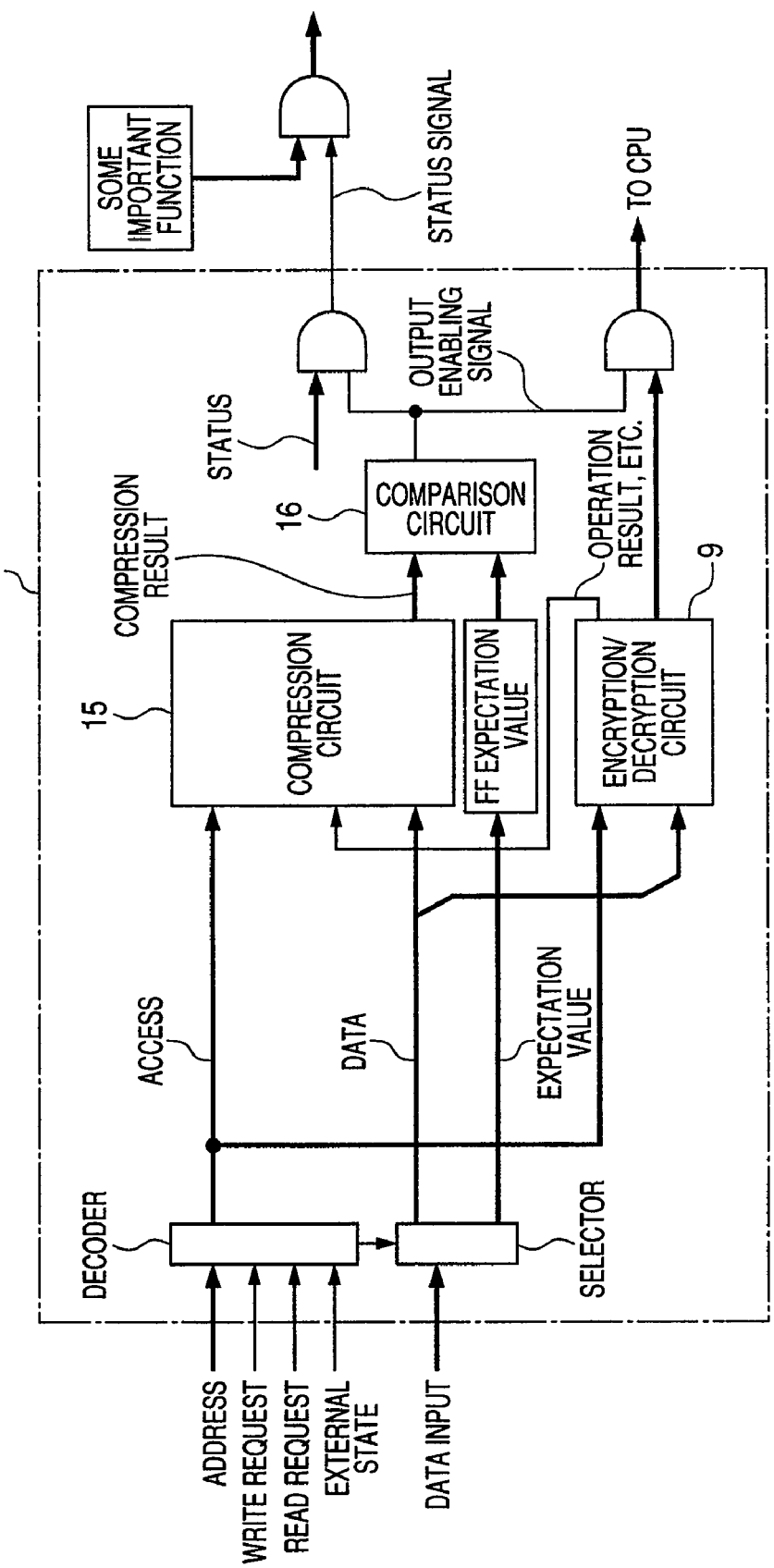
FIG. 2 is a block diagram illustrating a security unit, according to the embodiment of the present invention.
Figure 3:
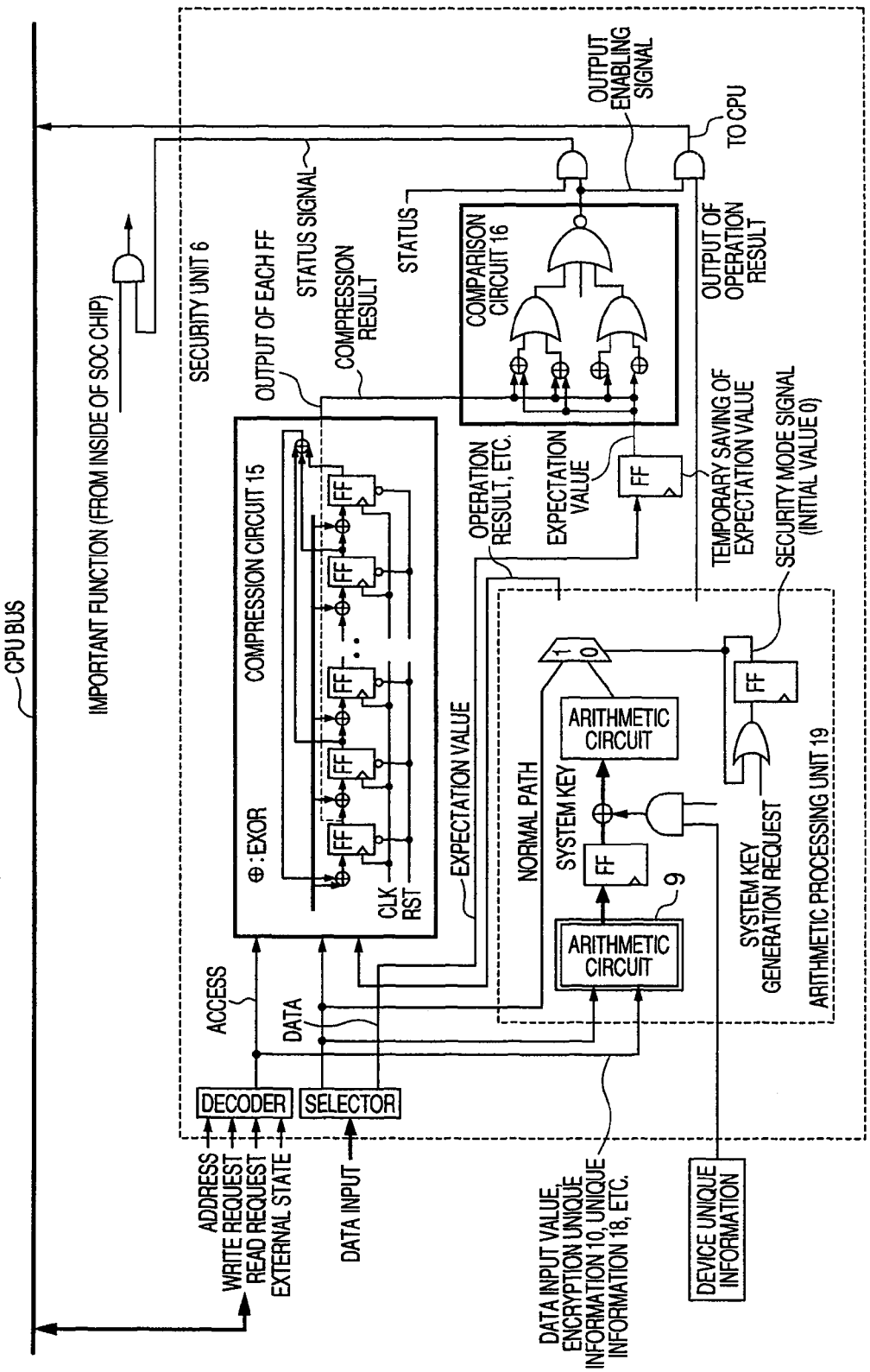
FIG. 3 is a block diagram illustrating a security unit, according to the embodiment of the present invention.
Figure 13:
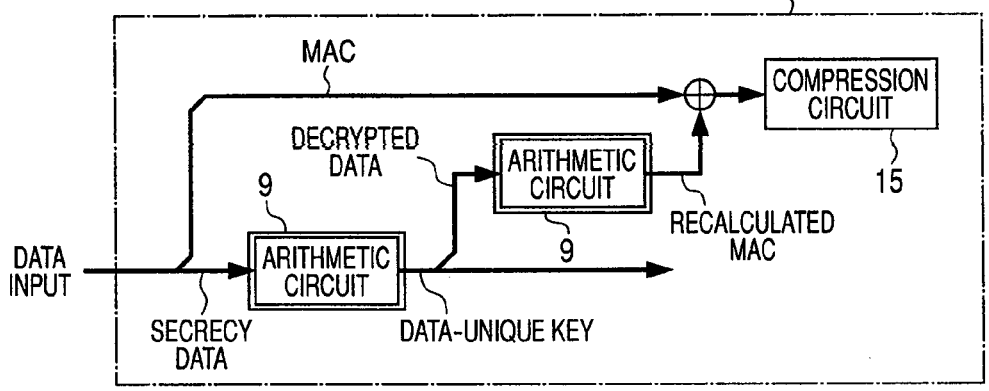
FIG. 13 is a drawing illustrating an example of MAC verification of secrecy data, according to the embodiment of the present invention.

FIG. 2 illustrates a block diagram of a security unit according to the embodiment of the present invention. FIG. 3 illustrates an example of internal configuration of the security unit 6 illustrated in FIG. 2. The present example of the internal configuration employs the circuits illustrated in FIGS. 2, 4, 6, 11, and 12. An arithmetic processing unit 19 changes its configuration according to arithmetic processing contents. For example, when performing the MAC comparison of secrecy data as illustrated in FIG. 13, the arithmetic processing unit 19 has the configuration as illustrated in FIG. 13. FIG. 13 will be explained later. As illustrated in FIGS. 2 and 3, the security unit 6 has, in addition to the encryption/decryption circuit 9, a compression circuit 15 (compression means) which compresses (encodes) an access signal, that is a signal used in accessing the security unit 6, and outputs the compression result, and a comparison circuit 16 (comparison means) which compares the compression result outputted from the compression circuit 15 with a previously-obtained expectation value of the compression result of the access signal. Here, the access signal includes signals which have a certain influence to the security unit 6, such as an address, a write request, a read request from CPU 2, the state of the exterior of the security unit 6, a data input, and the operation result of the encryption/decryption circuit 9.

Figure 4:
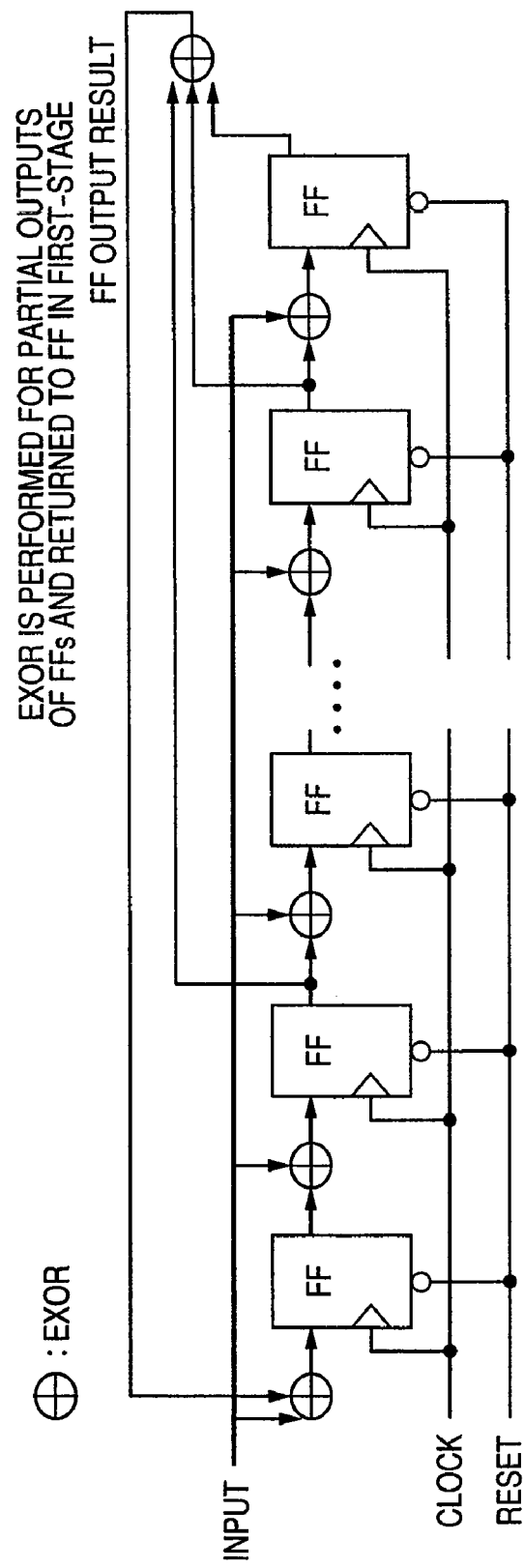
FIG. 4 is a drawing illustrating an example of configuration of a compression circuit, according to the embodiment of the present invention.
Figure 5:
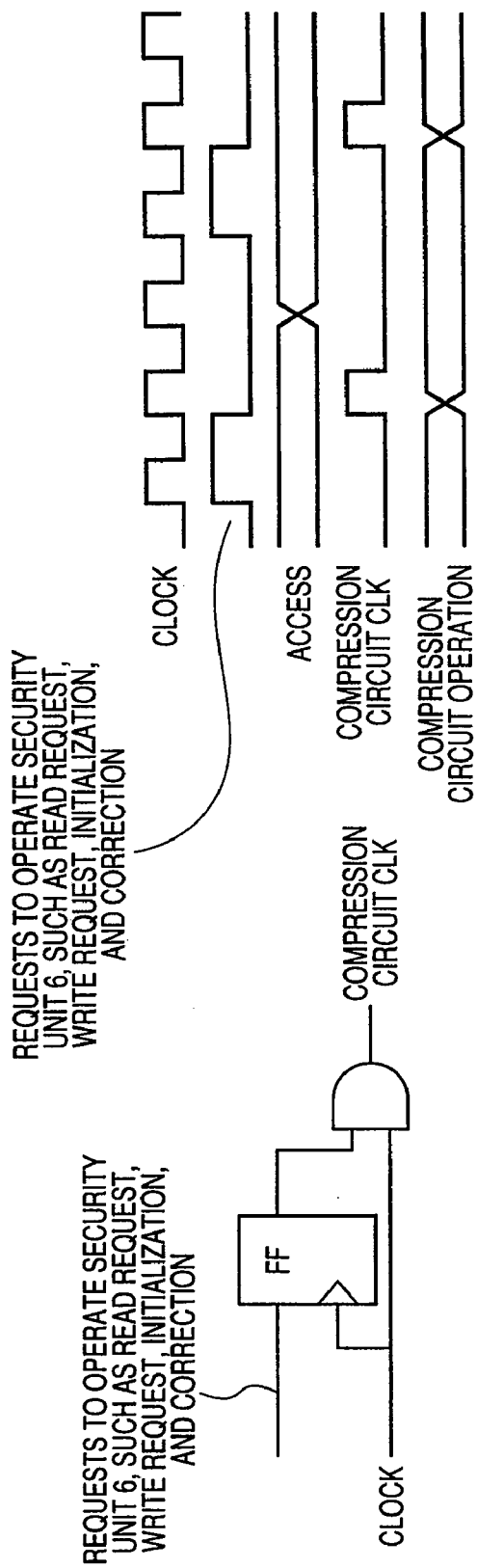
FIG. 5 is a drawing illustrating operation of the compression circuit, according to the embodiment of the present invention.

FIG. 4 illustrates an example of configuration of the compression circuit 15. The access signal inputted into the security unit 6 is compressed in the compression circuit 15. The compression circuit 15 according to the present embodiment is composed by combining an exclusive OR (EXOR) and a linear feedback shift register (LFSR). It is desirable to compose the compression circuit 15 by a circuit which is not subject to reverse calculations, such as a Hash function, or a circuit of which the input value is partly fixed and which cannot be set up freely from the exterior. The reason of performing the compression is to create the number of bits which is easy for the compression circuit 15 to handle the history of the access signal. The number of bits is 128 bits in the case where AES (Advanced Encryption Standard) is mounted, and 64 bits in the case where DES (Data Encryption Standard) is mounted. The compression result becomes data which has memorized the history of the access signal. As shown by the operation timing of the compression circuit 15 illustrated in FIG. 5, the access signal is taken in each time when the operational request is inputted to the compression circuit 15.

Figure 6:
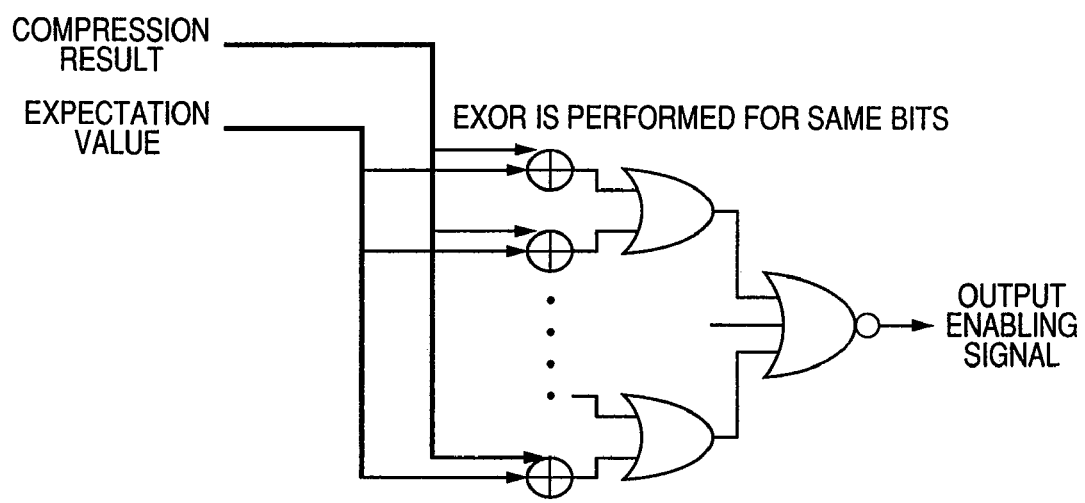
FIG. 6 is a drawing illustrating an example of configuration of a comparison circuit, according to the embodiment of the present invention.
Figure 7:
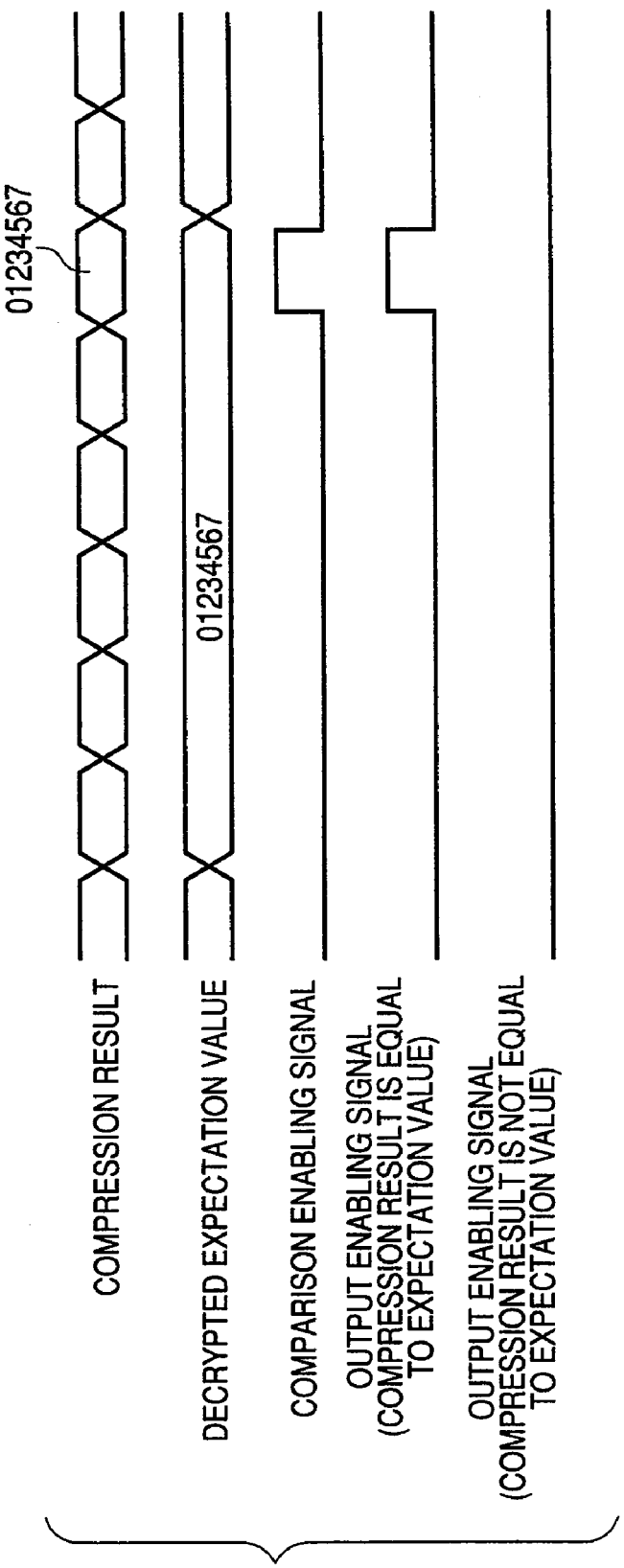
FIG. 7 is a drawing illustrating operation of the comparison circuit, according to the embodiment of the present invention.

FIG. 6 illustrates the configuration of the comparison circuit 16. The comparison circuit 16 is used when outputting data from the security unit 6. When data such as the result of an operation and the information on an internal status are outputted from the security unit 6, a comparison request signal (comparison enabling signal) is sent to CPU 2 and an output enabling signal is set to "H", as illustrated in FIG. 7. Then, the data output from the security unit 6 becomes effective.

The prevention method against data output by unjust access from a third party is explained.

After the power source is turned on, the access signal inputted into the security unit 6 is compressed (encoded) successively in the compression circuit 15, and is outputted to the comparison circuit 16. The compression result outputted from the compression circuit 15 changes for every access signal inputted. In addition to the compression result, the expectation value calculated in advance for the compression result is inputted into the comparison circuit 16. The expectation value is written in advance in the program, which is stored in the non-volatile memory 3. The expectation value is inputted into the security unit 6 together with the access signal. One who is permitted access to the security unit 6, such as a driver implementer, understands the compression method in the compression circuit 15 (the input data value, the control procedure of a register, etc.). Therefore, when preparing a program for accessing to the security unit, the compression result outputted from the compression circuit 15 can be calculated in advance, and can be reflected to the program as the expectation value.

The comparison circuit 16 compares the inputted compression result with the inputted expectation value, and sets an output enabling signal to "H" when the comparison result indicates agreement. As the result, the output to CPU 2 etc. is permitted. On the other hand, if unjust acts, such as change of a program, are committed, the compression result which is outputted from the compression circuit 15 differs from the expectation value; therefore, the data decrypted in the encryption/decryption circuit 9 is not outputted. Based on the output enabling signal outputted from the comparison circuit 16 and the status of the security unit 6, a status signal can be generated. The status signal can control the data output outputted by a certain important function in the data processing apparatus 1. It is assumed that the important function illustrated in FIG. 3 is a signal which is outputted from a certain block and which is desired to be controlled without the intermediary of CPU 2.

In this way, the above-described configuration makes it possible to detect an unjust falsification act and to cut off the transmission path of data so that the altered data may not be outputted. From a viewpoint that security strength should be raised as for the compression circuit 15 and the comparison circuit 16, it is desirable that the functions of the compression circuit 15 and the comparison circuit 16 are realized by hardware. However, the functions may be realized by software, if permissible from a viewpoint of security strength.

The program which controls the security unit 6 is stored in the non-volatile memory 3, for example, and CPU 2 accesses the security unit 6 according to the program. Since CPU 2 and the non-volatile memory 3 are outside the security protection area in the present case, there is a possibility that the program stored at the non-volatile memory 3 or the state of CPU 2 may be altered by a malicious third party. Here, the state of CPU 2 means falsification of a program counter, rewriting of a register, rewriting of a CPU status flag, etc. by coupling a debugger. When the program is altered, a certain change will occur in the access signal to the security unit 6; therefore, it is possible to detect the falsification by the comparison result in the comparison circuit 16. CPU 2 can take the measures of stopping each function of the data processing apparatus 1, after generating an error which indicates the falsification, according to the detected falsification result. Accordingly, CPU 2 can notify the user of the data processing apparatus of the fact that the unjust processing has occurred. Since the processing necessary for the decryption of data stops when the unjust processing is detected, the data to be sent to the MPEG decoder 7 becomes a haphazard value. Therefore, it is difficult to unjustly reproduce the data even if the data is outputted to output devices including a display apparatus such as CRT (Cathode Ray Tube), through an output bus 14 from the output I/F circuit 8. In this way, the defense processing to the unjust act can be performed by notifying the exteriors, for example, the output devices, of the error flag which indicates the falsification. That is, when the compression result differs from the expectation value as a result of comparison by the comparison circuit 16, the signal decrypted in the encryption/decryption circuit 9 is not outputted, or the result of the comparison concerned is notified.

Figure 8:
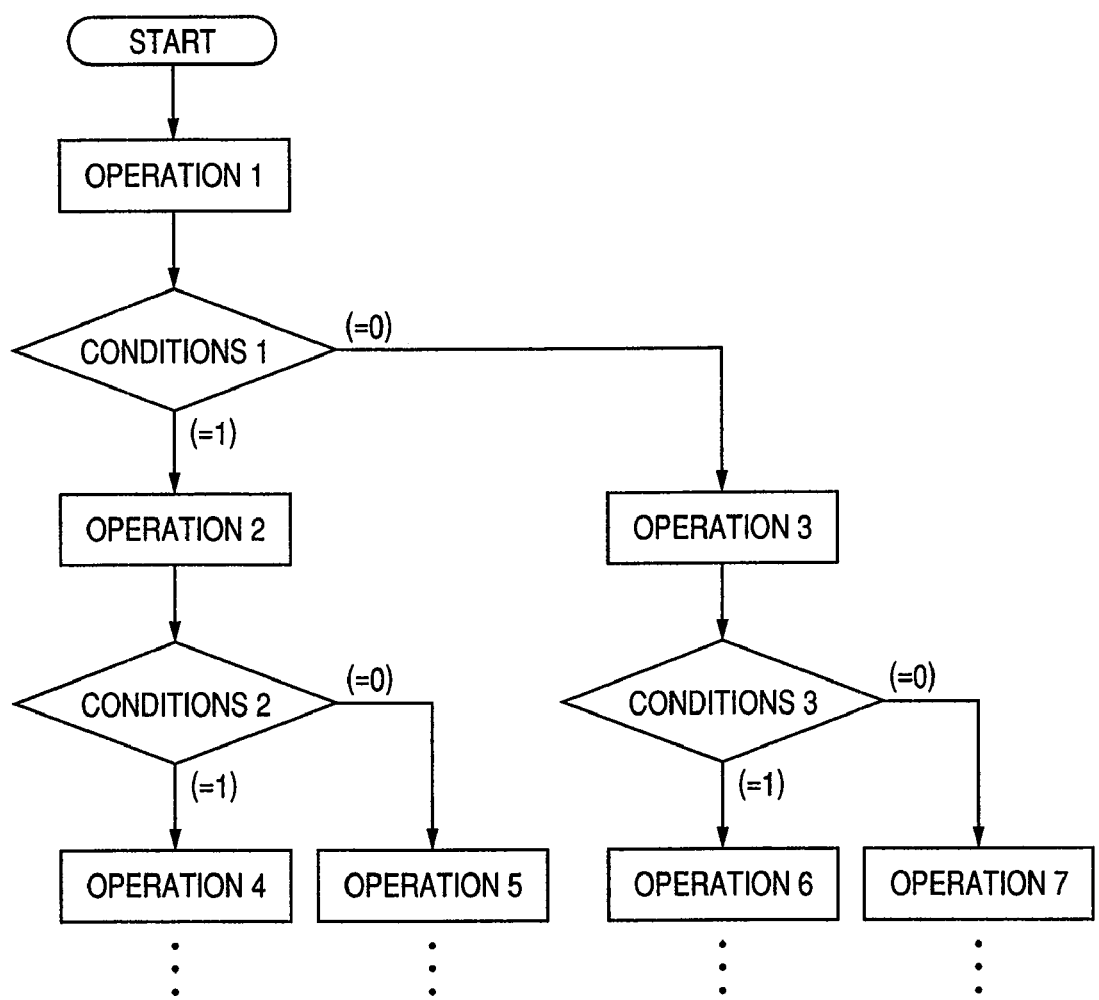
FIG. 8 is a flow chart illustrating an example of determination of a conditional branch of a program, according to the embodiment of the present invention.

The operation concerning encryption is realized in many cases, by combining plural operations based on a positive sign or a negative sign of the calculation result, for example. Determination of a conditional branch in operation is performed by CPU 2. FIG. 8 is a flow chart illustrating an example of determination of a conditional branch of a program. As illustrated in FIG. 8, plural operations and conditional branches exist in the arithmetic processing. In the case where operations are performed on condition of the result of an operation, such as a sign generated from the encryption/decryption circuit 9, CPU 2 selects the operation to be performed based on the result of the operation read from the encryption/decryption circuit 9, and performs the operation. However, at this time, there is a possibility that falsification may be made by a malicious third party, using a debugger etc. For example, in FIG. 8, when Conditions 1, 2, and 3 are determined to be (0, 1, 1), respectively, the processing will be performed in order of Operation 1, Operation 3, and Operation 6. However, if Condition 1 is rewritten to a value (1) by falsification, the processing will be performed in order of Operation 1, Operation 2, and Operation 4.

Figure 9:
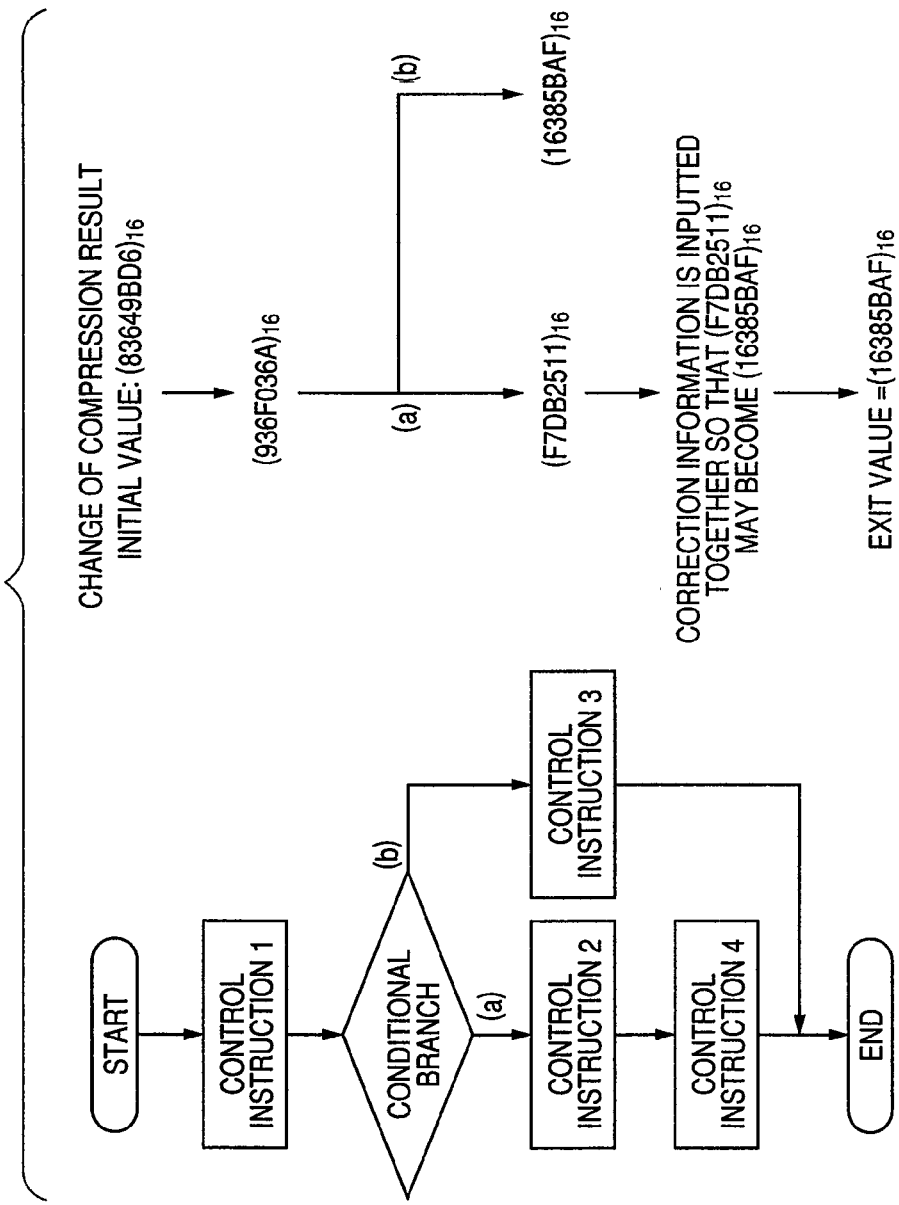
FIG. 9 is a drawing illustrating an example of correction of a compression result in the case of joining after branching in the processing of the program, according to the embodiment of the present invention.

In the present embodiment, the arithmetic processing is performed in the encryption/decryption circuit 9, and the conditional branch which is the result of the operation, or information such as a correction value etc. illustrated in FIG. 9 (to be described later) are inputted into (taken in) the compression circuit 15 if needed. Accordingly, the comparison circuit 16 compares the compression result outputted from the compression circuit 15 with the expectation value. Therefore, since an unjust processing is detectable with the comparison of the compression result with the expectation value, even if CPU 2 is forced to carry out different conditional determination from the result of the operation by an unjust operation, the unjust act can be detected based on the compression result (the fact that determination has been altered from a right value "0" to a false value "1" can be detected). Accordingly, it becomes possible to prevent the output of the altered data by stopping the security unit 6, for example. In addition, by inputting into the compression circuit 15 the information which indicates the state of the encryption/decryption circuit 9, such as an end of operation, it is possible to enforce the advancement to the next processing after the end of operation. This is for preventing that the effect similar to the falsification of operation is obtained, if the processing can be advanced without waiting for the end of operation, in the case where the result of the operation is used for the next operation. However, when the case does not correspond to such operation, it is not necessary to make the result of the operation reflect in the compression result.

In the case of the processing accompanied by a branch in a program, when the program joins after the program branches, the compression result outputted from the compression circuit 15 is different. Therefore, it is necessary to compensate the compression result. FIG. 9 illustrates an example of correction of a compression result in the case of joining after branching in the processing of the program. In the present embodiment, it is assumed that the compression result has 32 bits and that the initial value of the compression circuit 15 is $(83649bd6)_{16}$, for example. By executing Control Instruction 1, the compression result changes from $(83649bd6)_{16}$ to $(936f036a)_{16}$. After Control Instruction 1, a condition (a) or a condition (b) is practiced by the conditional branch instruction. In the case of the condition (a), Control Instruction 2 is executed and the compression result changes to $(f7db2511)_{16}$. In the case of the condition (b), Control Instruction 3 is executed and the compression result changes to $(16385baf)_{16}$, and the conditional branch processing is completed. In the case of the condition (a), at the time of the execution of Control Instruction 4 after the execution of the Control Instruction 2, a correction value is inputted to the compression result $(f7db2511)_{16}$ after the execution of Control Instruction 2 so that the executed result by Control Instruction 4 may be set to $(16385baf)_{16}$ which is the result of the branching process of the condition (b). The correction value can be calculated when the arithmetic method of the compression circuit 15 is known.

By performing the above operation, even in the case where a conditional branch occurs in the program, it becomes possible to advance the processing, adjusting the compression result so that mismatching may not arise in the compression result after joining. That is, the encrypted signal includes a program which controls the security unit 6, and in the case where the program is accompanied by a conditional branch, a correction value is inputted into the compression circuit 15 so that the compression result may become the same, when the program joins after the conditional branch. Therefore, it is possible to detect the falsification of access to the security unit 6, such as rewriting of the program. Since it is possible to perform stopping of the data output to CPU 2 and stopping of a specific function by detecting such a falsification, it becomes possible to prevent acquisition of the secrecy data by an unauthorized access. In addition to stopping of the data output by the detection of the falsification, the other processing such as stopping of the response by the security unit 6 is also effective. In the present embodiment, it is possible to detect the falsification, even when the determination result of the conditional branch is altered by unjust operation, by inputting the result of the operation by the encryption/decryption circuit 9 into the compression circuit 15.

The program in which the expectation value and the correction value are incorporated is stored outside the security protection area. For example, since the non-volatile memory 3 is usually mapped in the memory space of CPU 2, the contents of the non-volatile memory 3 can be easily read out by coupling a debugger. The expectation value and the correction value which are incorporated in the program are encrypted in advance and stored in the non-volatile memory 3. However, it is more desirable to provide a means to use the expectation value and the correction value safely, since these data may serve as data to conjecture the calculation method of the compression circuit 15.

Figure 10:
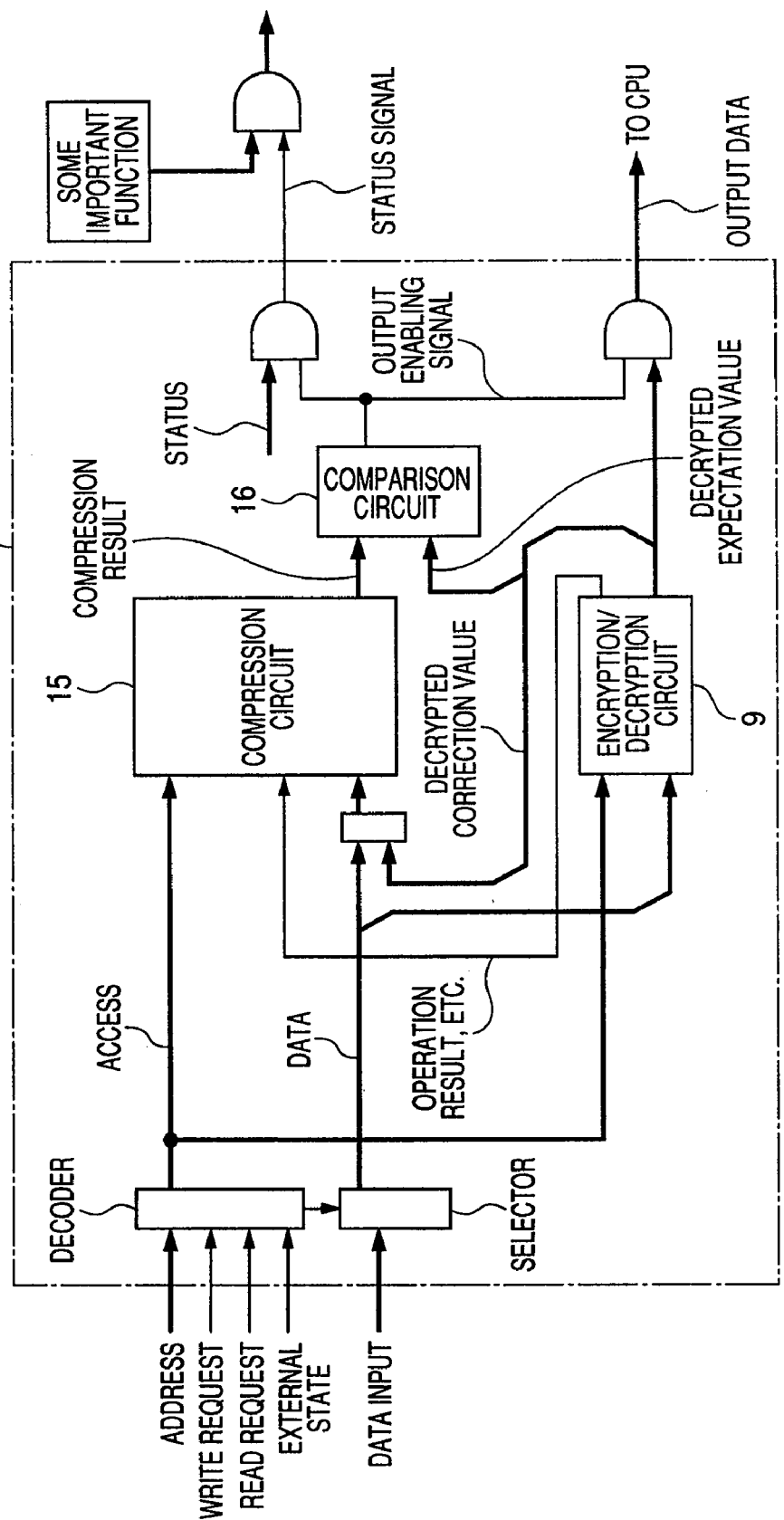
FIG. 10 is a block diagram illustrating the security unit, according to the embodiment of the present invention.

FIG. 10 is a block diagram illustrating a security unit 6 according to the embodiment of the present invention. In the security unit 6 illustrated in FIG. 10, the encrypted signal includes an expectation value and a correction value, and the encrypted expectation value and the encrypted correction value are decrypted in the encryption/decryption circuit 9. The present configuration makes it difficult to analyze the compression circuit 15, based on the expectation value or the correction value. As illustrated in FIG. 10, the encrypted expectation value is inputted into the security unit 6 from a data input and decrypted in the encryption/decryption circuit 9, and then inputted into the comparison circuit 16. On the other hand, the encrypted correction value is inputted into the security unit 6 from the data input and decrypted in the encryption/decryption circuit 9, and then inputted into the compression circuit 15.

The above-described configuration can make it difficult to specify the specifications of the compression circuit 15, from the data stored outside the security protection area, such as the expectation value, the correction value, etc. stored in the non-volatile memory 3. Since the encryption/decryption circuit 9 used for the decryption of contents can be shared for the above described processing, the circuit scale can be suppressed. In addition, it is possible to obtain the difficulty of the decipherment, which is comparable to the degree of the difficulty in the decryption of contents. Although the encryption/decryption circuit 9 is used in performing the above processing in the present embodiment, an arithmetic circuit different from the encryption/decryption circuit 9 may be used for performing the above processing.

A circuit to be initialized exists in the interior of the security unit 6. For example, in the compression circuit 15, it is desirable to prevent a malicious third party from initializing at arbitrary timing, and to prevent from conjecturing the initial value. FIG. 11 illustrates a method of initialization of the compression circuit 15.

First, CPU 2 performs access for generation of a system key necessary for initialization in order to operate the security unit 6. Here, the system key is a key which serves as a source for encrypting and decrypting the secrecy data of a fixed value which is stored in the non-volatile memory 3, etc., and which does not change for every power-on. The system key has a different value for every system. The system key is generated by an arithmetic circuit in the encryption/decryption circuit 9, using unique information 18 made of constant information of which the reading-out to the exterior of the security unit 6 is difficult, and encryption unique information 10 stored in the non-volatile memory 3. When the system key is generated, a security mode signal becomes "H" in response to the generation request (=1) of the system key. The security mode signal is "0" until the system key is generated. The system key is inputted into the compression circuit 15 as a initial value through an arithmetic circuit. After the generation of the system key, the security mode signal is set to "1"; therefore, only the input through a normal path is allowed to the compression circuit 15. That is, the value generated by passing the system key through the arithmetic circuit in the encryption/decryption circuit 9 is used as the initial value of the compression circuit 15. When the generation request of the system key is issued by CPU 2, the compression circuit 15 is initialized only once. In the present embodiment, the arithmetic circuit for stirring the system key is provided in order to make analysis of the system key difficult. However, the compression circuit 15 may be initialized with the system key.

In the above example, the circuit configuration can not render the security mode signal non-active. However, when a function to render a once-activated security mode signal non-active is provided, what is necessary is just to prevent the unjust use of data by providing a function which renders the security mode signal non-active and which clears the data storage area associated with the security used at the time when the security mode signal is active. In the present embodiment, the security mode signal is used as a select signal of a selector which is provided before the input of the compression circuit 15. However, the security mode signal may be inputted into the decoder illustrated in FIG. 2 to invalidate an initialization access to the compression circuit 15 at the time of security mode.

As described above, it is possible to prevent the unjust use to the compression circuit 15 and to make analysis about the compression method difficult, by initializing the compression circuit 15 only at the time of generating the system key.

In order to prevent unjust decryption of contents by the duplication of a device, a key for decrypting contents and information necessary for generating the key are made different for every device. These pieces of information are stored in the non-volatile memory 3 which exists outside the security protection area; therefore, there is a possibility that the information may be read by a malicious third party and may be copied to a non-volatile memory 3 of another device (duplication). Therefore, it is necessary to prevent the information in the non-volatile memory 3 from being copied. FIG. 12 is a drawing illustrating copy protection of the non-volatile memory 3. As illustrated in FIG. 12, device unique information 17 is unique information of the non-volatile memory 3 in the data processing apparatus 1. Any data will serve as the device unique information 17, if the data has different values for every memory and does not change after once written in. For example, a fuse ROM, wiring cutting by an electron beam, etc. may be used. When the device unique information 17 is included in generation of the system key, the device unique information 17 can be used only for that memory. Therefore, even in the case where the data in the non-volatile memory 3 outside the security protection area is duplicated, it is possible to prevent the encryption unique information from being diverted in the other devices.

A key for decrypting contents and information necessary in order to generate the key are stored in the non-volatile memory 3 outside the security protection area, as the encryption unique information 10. Since the encryption unique information 10 is secrecy data, it is necessary not only to perform encryption but to add a signature (Media Access Control: MAC). It is insufficient to carry out the determination of MAC verification only by CPU 2, since there is a possibility that the determination may be altered when the determination is made by CPU 2.

FIG. 13 illustrates an example of the MAC verification of secrecy data. As illustrated in FIG. 13, when the secrecy data, such as the encryption unique information 10, are inputted into the security unit 6 from the non-volatile memory 3, after the secrecy data is decrypted by an arithmetic circuit in the encryption/decryption circuit 9 (decrypted to a MAC value of the secrecy data), MAC is again generated by the arithmetic circuit in the encryption/decryption circuit 9. Then, the comparison result of the MAC inputted from the data input and the MAC regenerated based on the decoding result described above is inputted into the compression circuit 15. As a specific example, when the secrecy data is encrypted, then added with MAC, and outputted to the exterior of the security unit 6 temporarily (storing in RAM 5 temporarily, for example) and when the secrecy data is used again, the secrecy data is decrypted by the above-described configuration and the MAC is verified. Then, by reflecting the verification result to the compression result of the compression circuit 15, it is determined that falsification has been performed if the data is not correct.

In this way, since the MAC verification is determined not in CPU 2 but in the compression circuit 15, the MAC verification result of the secrecy data obtained by comparison can be reflected to the compression result of the compression circuit 15, and the unjust falsification to the secrecy data can be prevented in the security unit 6.

Plural encryption/decryption circuits 9, such as a common key encryption and a public key encryption, are used for the protection of contents. Therefore, plural pieces of encryption unique information 10 may also exist. When such secrecy data is encrypted with a single key, for example, a system key, every secrecy data can be decrypted with the system key; therefore, it will become possible to replace the secrecy data unjustly. Namely, assume the case where there are plural pieces of secrecy data to manage and the secrecy data is managed with the same key. In that case, even if the secrecy data is replaced, it is difficult to detect the fact that the secrecy data has been replaced. Therefore, it is desirable to prevent the unjust exchange of the secrecy data.

Figure 14:
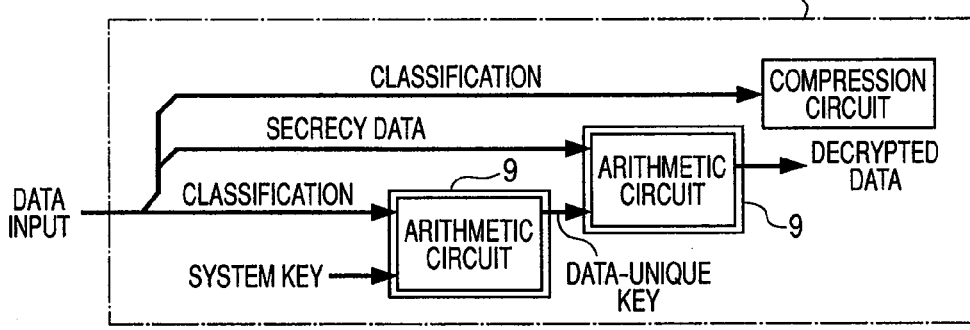
FIG. 14 is a drawing illustrating an example of prevention from exchange of the secrecy data based on classification, according to the embodiment of the present invention.

FIG. 14 illustrates an example of the prevention from exchange of the secrecy data based on classification. In the present embodiment, classification is used as unique information to each secrecy data. Since the classification is data (classification data) which indicates the kind of secrecy data and has a unique value, the classification is stored in the non-volatile memory 3. As for the value of classification, the implementer of a program may determine an optional value to each data. As illustrated in FIG. 14, CPU 2 performs writing access of classification from the data input. The classification written in the security unit 6 is calculated with a system key in an arithmetic circuit in the encryption/decryption circuit 9, and a data unique key is generated. In this way, without using the system key as it is, the classification is prepared for every secrecy data, and is included in the data unique key as the information of the key. The generated data unique key is calculated in the arithmetic circuit, based on the classification of a different value for every secrecy data. Accordingly, the data unique key is proper to the secrecy data. The inputted secrecy data is calculated and decrypted with the data unique key in the arithmetic circuit in the encryption/decryption circuit 9. When the MAC verification of the decrypted data is necessary, the processing illustrated in FIG. 13 is performed subsequently. The classification is inputted also into the compression circuit 15 in order to be reflected to the compression result, and is used to detect falsification such as the exchange of data. Namely, since a key is different if a wrong classification is specified, it is possible to detect the fact that the data has been replaced.

Thus, in the decryption of the secrecy data, by decrypting the secrecy data with the use of the classification data indicating the kind of the secrecy data, and by inputting the classification data into the compression circuit 15, it is possible to stop decryption of the secrecy data when the secrecy data has been replaced, since the classification does not match and the data unique key is not generated correctly. Rewriting classification corresponds to altering a program; therefore, it is also possible to detect the falsification of the program. Furthermore, by combining the present scheme with the MAC verification illustrated in FIG. 13, it is possible to realize double verification, since the MAC verification results in disagreement when the secrecy data is replaced.

When there are plural parameters (a prime number, a fixed value of an elliptic function, etc.) used with public key encryption etc., it is inefficient to add another classification to the secrecy data used with an identical function, in making the program common. For example, when there are plural domain parameters of the MAC verification in an ellipse (curve) encryption, it is more efficient to make the procedure of MAC verification common, from the viewpoint of the program size or the development. Thus, in the operation in which the kind of operation is same and the parameter used is different, it is desirable that the parameter used for each operation is controlled. In the present embodiment, a group management code for managing groups is added to each parameter, and the group number is reflected in the key at the time of decryption. The group management code is data with a fixed value for distinguishing a secrecy data group of the same purpose, and is stored in the non-volatile memory 3. The value of the group management code is optionally determined by the implementer of a program.

Figure 15:
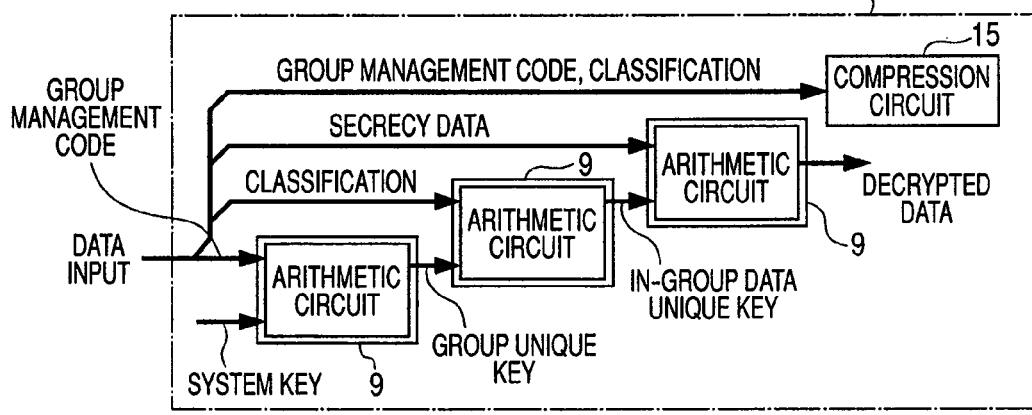
FIG. 15 is a drawing illustrating an example of prevention from exchange of the secrecy data based on a group management code, according to the embodiment of the present invention.

FIG. 15 illustrates an example of the prevention from exchange of the secrecy data based on a group management code. As illustrated in FIG. 15, the group management code inputted from the non-volatile memory 3 and the system key are calculated in an arithmetic circuit in the encryption/decryption circuit 9, and a group unique key is generated. The generated group unique key and the classification are calculated in an arithmetic circuit to generate an in-group data unique key, and the secrecy data is decrypted in an arithmetic circuit using the generated in-group data unique key. The group management code and the classification are inputted into the compression circuit 15 at this time.

Figure 16A:
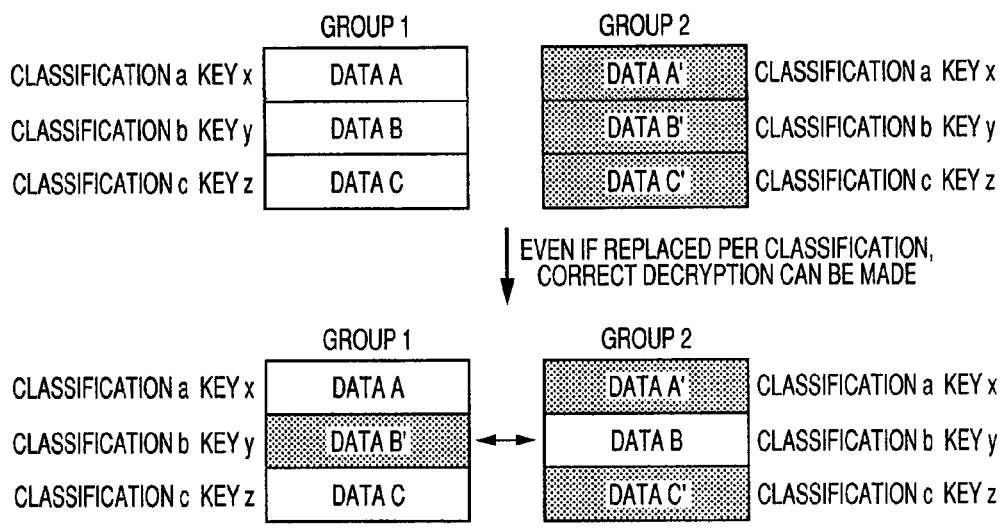
FIG. 16 (A) is an explanatory drawing illustrating the group management code, according to the embodiment of the present invention.
Figure 16B:
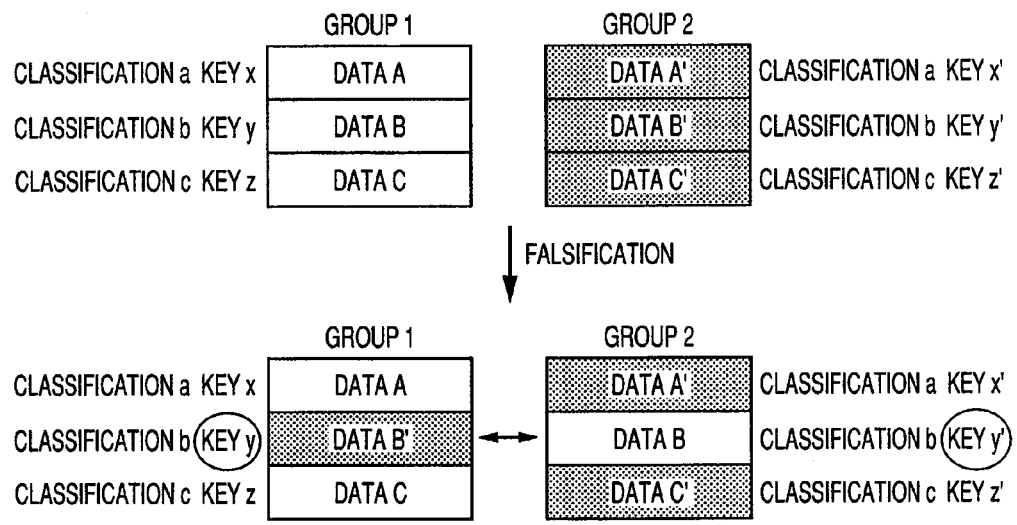

The classification added to the secrecy data group managed in a group may have a common value with the secrecy data of an identical function in other groups. FIG. 16 (A) and FIG. 16 (B) explain a group management code. In FIG. 16 (A), there are Group 1 and Group 2. Data A and Data A', Data B and Data B', and Data C and Data C' have respectively the same functions, and Classifications a, b, and c are added for the respective functions. In FIG. 16 (A), a group management code is not included in a key which decrypts data, and Keys x, y, and z independent of the groups are generated for the respective classifications. Therefore, the data of the identical function of Group 1 and Group 2 can be decrypted with the same key. That is, it is undetectable even if the data in the middle of a group is replaced. However, as illustrated in FIG. 16 (B), when the group management code is included in the key information which decrypts data, the key is different for each group even if the classification has an identical function; therefore, if data is replaced between the groups, correct decryption is not performed.

Thus, even if data is replaced unjustly among groups when the secrecy data is decrypted, the falsification can be detected by performing the decryption with the use of the group management code which distinguishes the secrecy data group of the same purpose, and by inputting the group management code into the compression circuit 15.

Since the amount of data which can be stored in the security unit 6 is limited, it may become difficult to continue a processing, storing in the security unit 6 all the secrecy data generated in the process of operation. In such a case, what is generally necessary is just to evacuate the secrecy data to RAM 5 provided in the exterior of the security unit 6 temporarily. However, since RAM 5 is outside the security protection area, it is desirable to protect the secrecy data evacuated temporarily.

Figure 17:
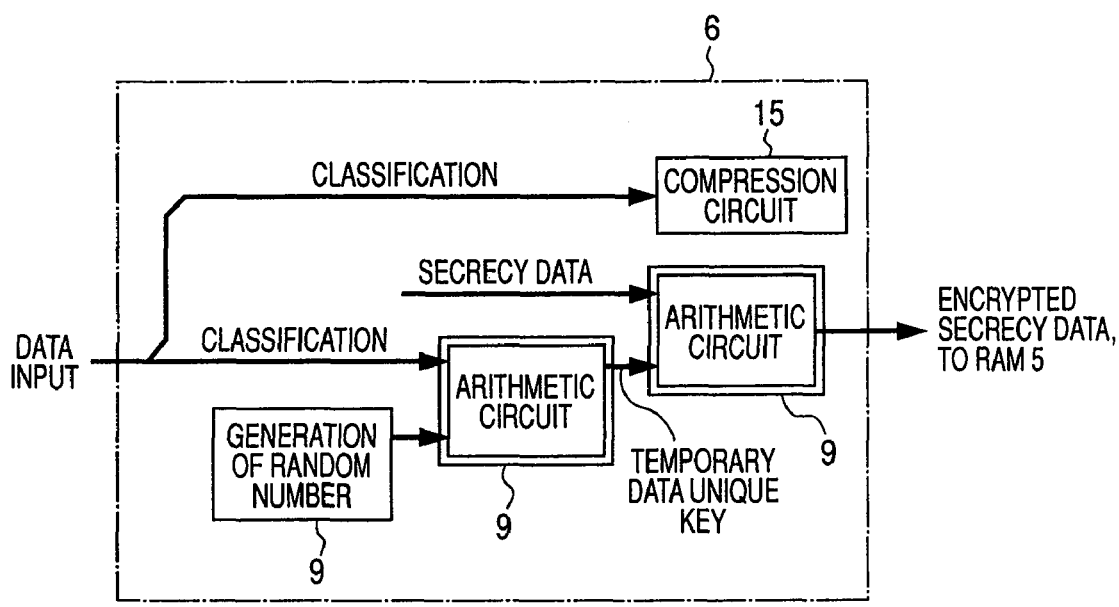
FIG. 17 is a drawing illustrating a temporary evacuation method of the secrecy data, according to the embodiment of the present invention.

FIG. 17 illustrates a temporary evacuation method of data. As illustrated in FIG. 17, a random number is generated by a random number generation function in the encryption/decryption circuit 9. The generated random number and the classification corresponding to the secrecy data inputted into the security unit 6 are calculated in an arithmetic circuit in the encryption/decryption circuit 9 to generate a temporary data unique key. The secrecy data is encrypted in an arithmetic circuit in the encryption/decryption circuit 9 using the temporary data unique key, and the encrypted secrecy data is outputted to RAM 5 in the exterior of the security unit 6. At this time, the classification of the secrecy data is inputted into the compression circuit 15. When outputting plural pieces of encrypted secrecy data, which data is outputted is determined by the classification. The classification is managed as a history in the compression circuit 15. The key is generated using an uncontrollable random number and the secrecy data is encrypted. Accordingly, it is difficult to input the data temporarily stored at another timing even if the classification of the data is the same. It is necessary to hold the generated temporary data unique key in the security unit 6 in a certain form, until the encrypted secrecy data is decrypted. The temporary data unique key is discarded after use.

Thus, in the case where RAM 5 (a storage unit) to temporarily store the data of the security unit 6 is provided further and the secrecy data is stored in RAM 5, the temporary data unique key is generated from the classification data and a random number, the secrecy data is encrypted using the temporary data unique key, and is stored in RAM 5. Accordingly, even if rewriting of data which may alter the program describing the procedure of generating and discarding the temporary data unique key is performed, it is possible to detect the fact that the falsification of the program has been performed.

The case of executing a program which has plural states (multitask) is explained. In the security unit 6, the existence or nonexistence of the falsification of data is detected based on the compression result outputted after being calculated in the compression circuit 15. Since the compression result changes according to the processing, the compression result can also be recognized as a state of transition in a program.

Figure 18A:
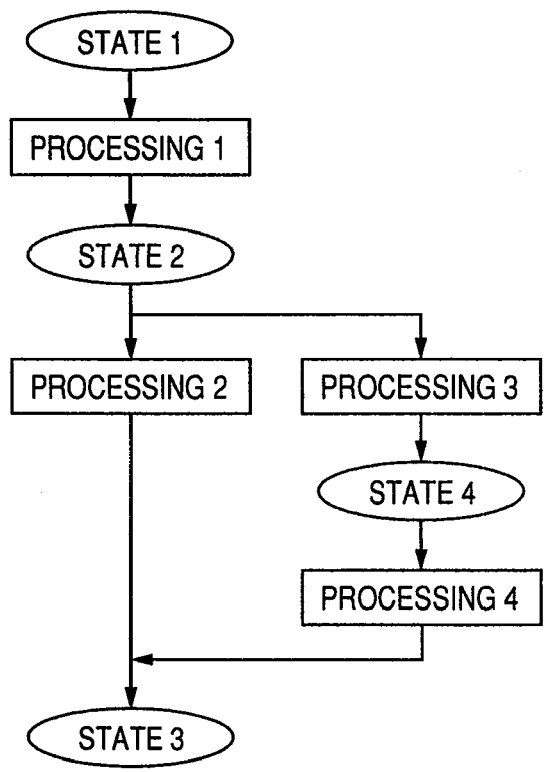
FIG. 18 (A) is a drawing illustrating an example of a state of processing in the security unit, according to the embodiment of the present invention.
Figure 18B:
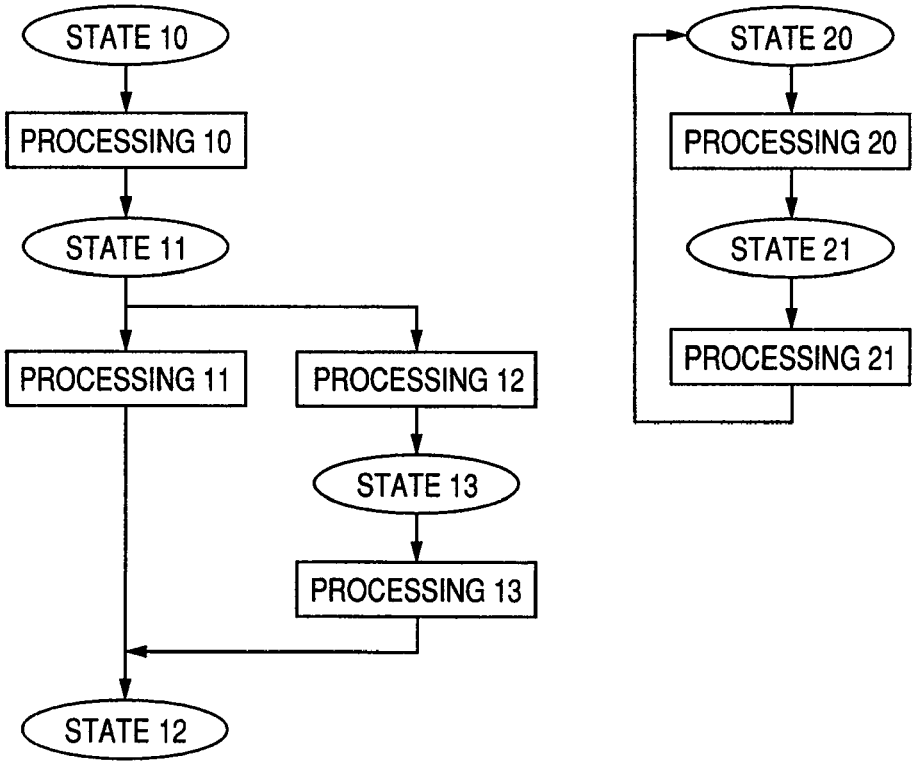

FIGS. 18 (A) and 18 (B) illustrate examples of the state of processing in the security unit 6. FIG. 18 (A) illustrates the case where there is only one state to hold at arbitrary timing. When the state to hold is one, the value of the compression result is decided uniquely corresponding to each of State 1 to State 4. On the other hand, as illustrated in FIG. 18 (B), when plural states need to be managed at the same time, the value of the compression result is not decided uniquely. For example, when processing starts from State 10 and State 20, the value of the compression result is not decided uniquely, since there is no relation in the processing of State 1x and State 2x. In the state transition illustrated in FIG. 18 (B), either of Processing 10 and Processing 20 may start first. However, the compression results differ depending on the sequence.

Figure 19A:
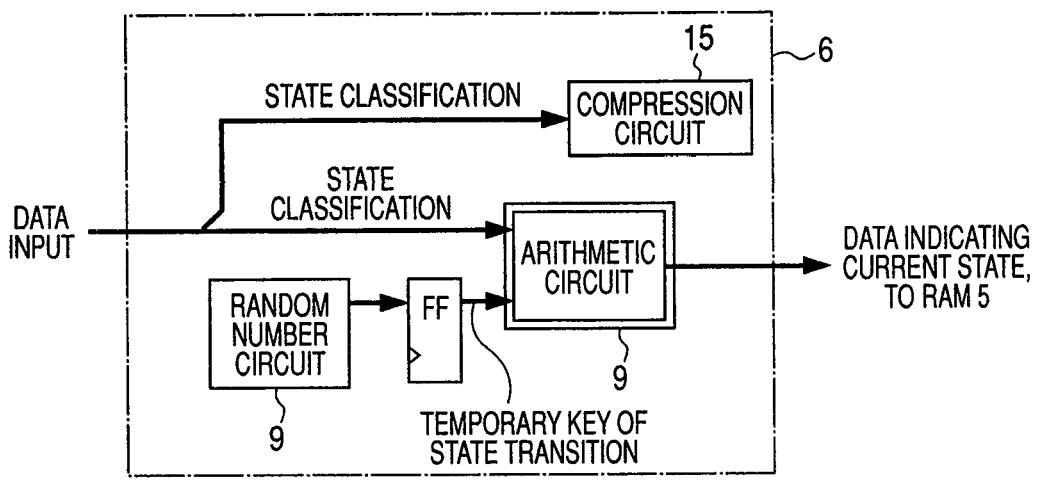
FIG. 19 (A) is a drawing illustrating a method to manage plural states in the security unit, according to the embodiment of the present invention.
Figure 19B:
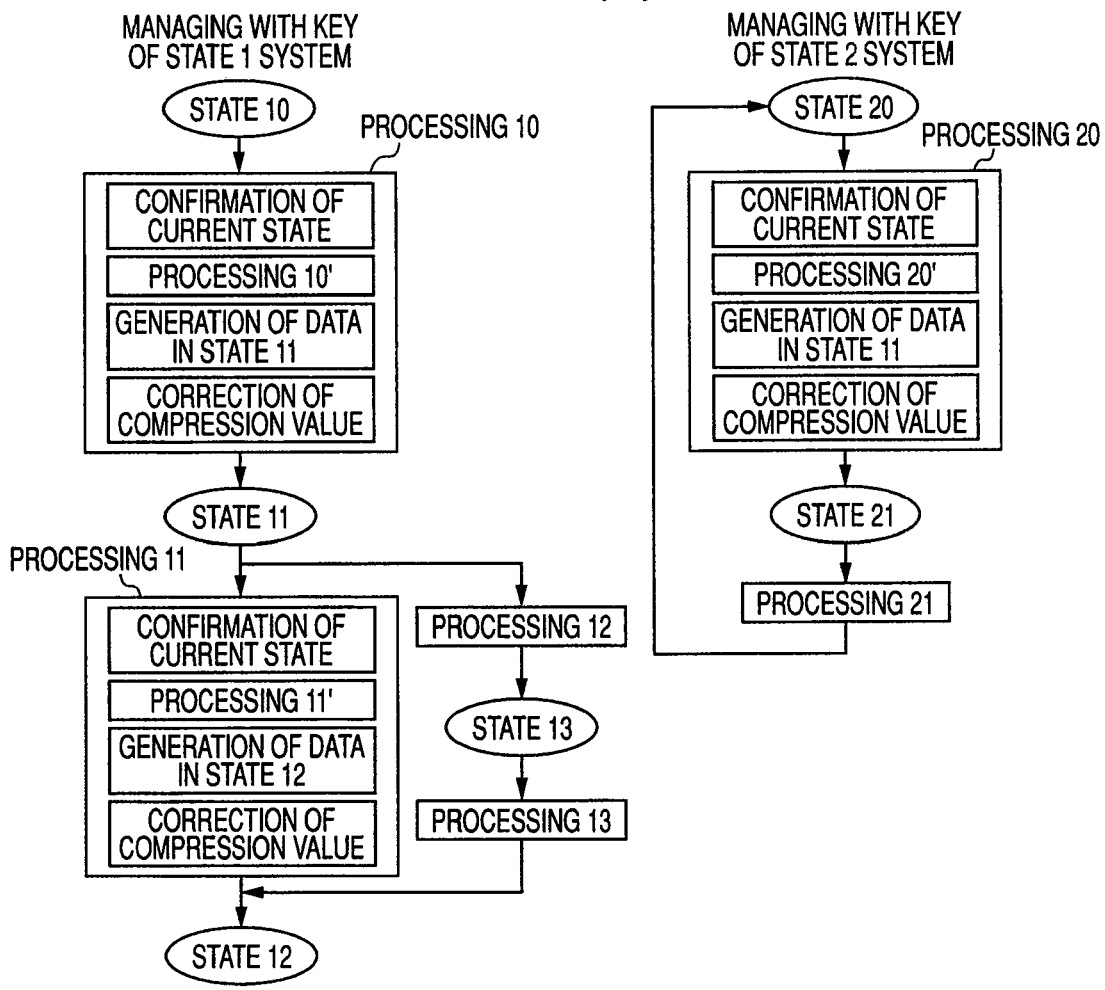

FIGS. 19 (A) and 19 (B) illustrate the method to manage plural states in the security unit 6. First, a temporary key corresponding to each state transition is generated using the random number generation function of the encryption/decryption circuit 9. The temporary keys are necessary in number as many as the number of the state transitions to be managed at the same time. For example, two temporary keys are necessary in FIG. 19 (B) (State 1 system and State 2 system). Next, classification is prepared as a unique value indicating each state, such as State 10, State 11, and State 21. The temporary key of the state transition generated in the random number generation function of the encryption/decryption circuit 9 and the classification of the state of data inputted are calculated in an arithmetic circuit in the encryption/decryption circuit 9, to generate the current-state-indicating data for every state transition. The generated current-state-indicating data is stored in RAM 5. The stored data serves as a mark indicating to which state the program is advancing currently. By such processing, the compression result in the state where the current-state-indicating data is stored in RAM 5 is determined uniquely, and is set as a reference value of the compression result. That is, in order to manage two unrelated states, the value of the compression circuit 15 is set as a certain reference value, and each processing (Processing 10, 11, 12, 13, 20, and 21) is performed from the reference value. In each processing of Processing 10, Processing 11, etc., the processing is practiced, after confirming the current state in order to ascertain whether the processing currently practiced is correct. This confirmation is performed by comparing the classification of the state corresponding to the processing, with the current-state-indicating data stored in RAM 5 in advance. When storing the current-state-indicating data in RAM 5, it is necessary to generate MAC as well, in order to prevent falsification. However, the MAC processing to data is omitted for simplification of the explanation.

Figure 20:
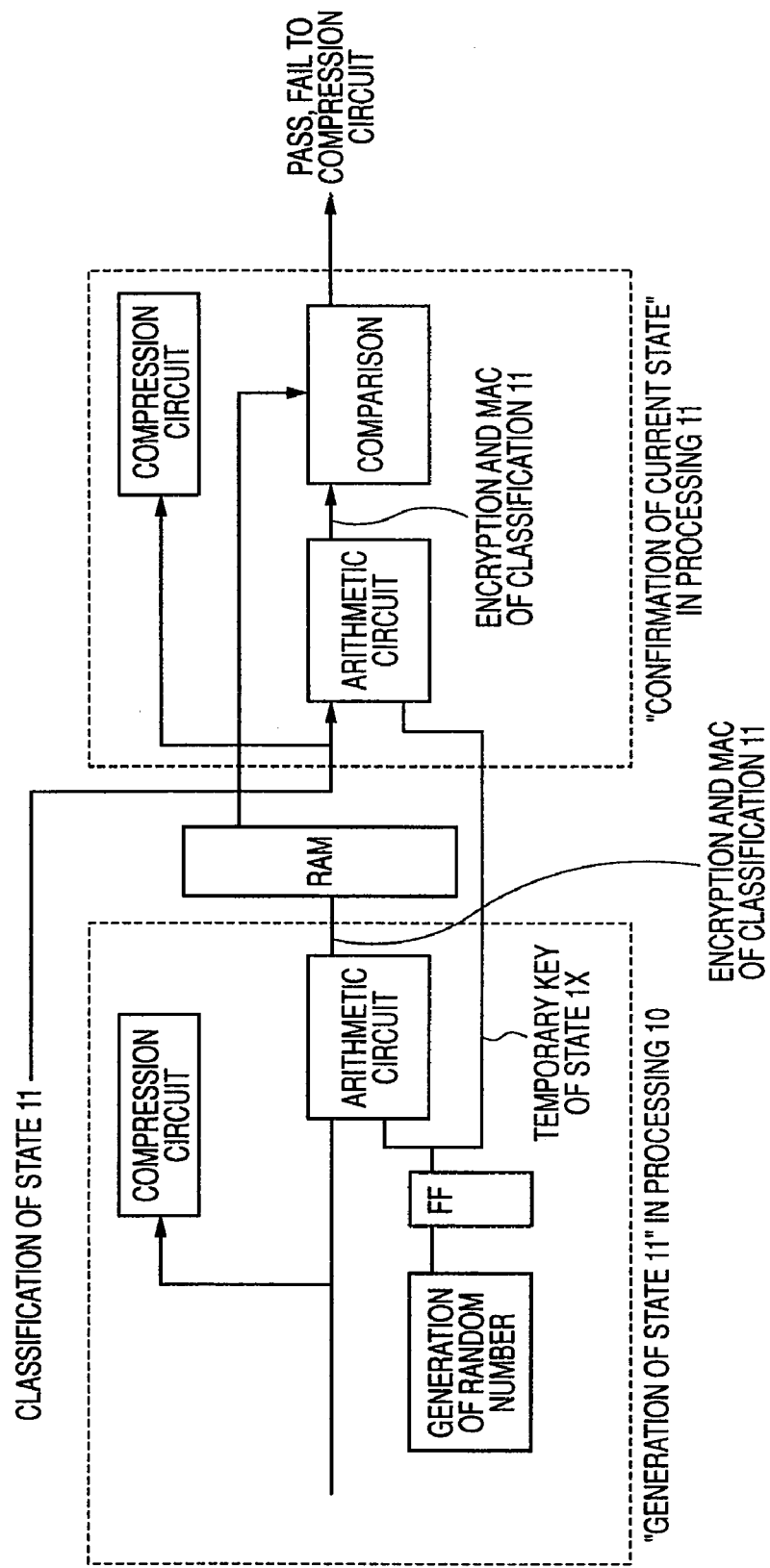
FIG. 20 is a drawing illustrating a method of generating state data and confirming the state, according to the embodiment of the present invention.

FIG. 20 illustrates generation of state data and a method of confirmation of state. As illustrated in FIG. 20, Processing 11 is performed in the state where Processing 10 is completed. Accordingly, the value stored in RAM 5 is verified, using the classification of Processing 10 in the program. All of the comparison result, the MAC verification result, etc. are reflected to the compression circuit 15. For example, in Processing 10, when there is no problem in confirmation of the current state, Processing 10' is performed. After completion of Processing 10', the temporary key of the state transition to be used in the following state (for example, State 11) is regenerated. Subsequently, the current-state-indicating data (data indicating State 11) is generated, using the classification which indicates the following state (State 11). The current-state-indicating data generated is stored in RAM 5. At the end of Processing 10, since the compression result is changed by the processing, a correction value is inputted so that the compression result may be restored to the reference value, then Processing 10 is completed. Thus, it is confirmed whether the processing practiced is correct, using the current-state-indicating data stored in RAM 5, and the falsification of the data of processing contents is, if any, detected using the compression result. Therefore, it becomes possible to practice safely the processing which has plural state transitions.

Figure 21A:
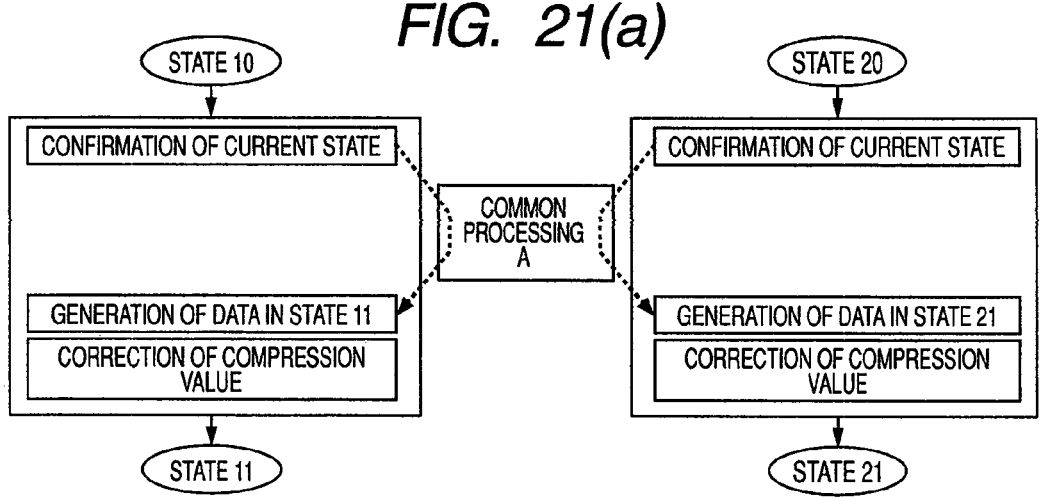
FIG. 21 (A) is a drawing illustrating common processing shared by plural states, according to the embodiment of the present invention.
Figure 21B:
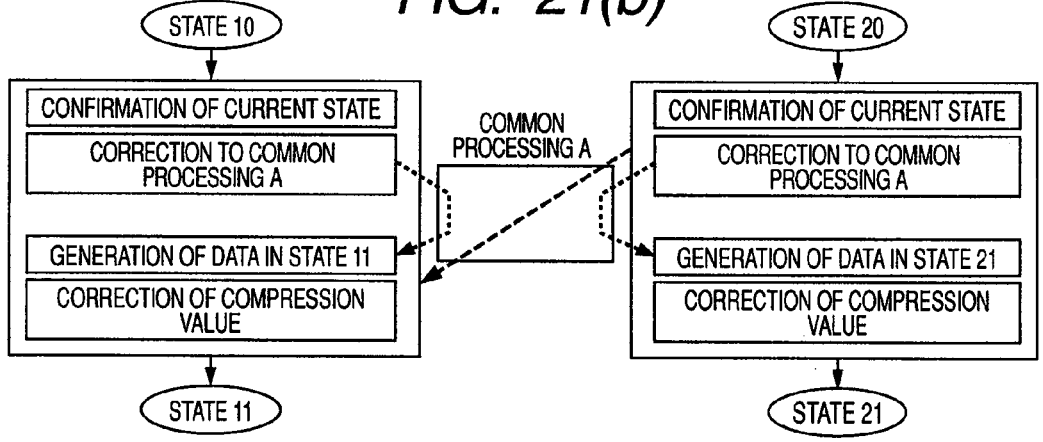
Figure 21C:
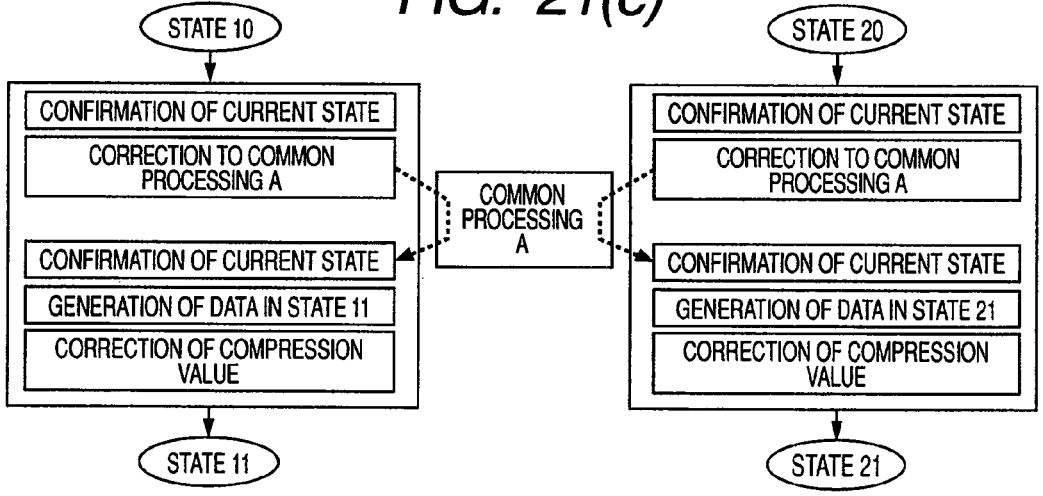

FIGS. 21 (A), 21 (B), and 21 (C) illustrate common processing shared by plural states. By making specific procedures common, such as MAC verification, there is an advantage that the maintenance of a program becomes easier or a program size becomes smaller. In the case where a part of processing of two states (Common Processing A) is made common as illustrated in FIG. 21 (A), when performing determination processing in Common Processing A using the compression result by the compression circuit 15, the compression result which is inputted into the compression circuit 15 in Common Processing A is different in each state; consequently, the processing is not performed correctly. Therefore, as illustrated in FIG. 21 (B), compensation is made in the processing of each state so that the compression result may become common, when proceeding to Common Processing A (the value of the compression circuit 15 serves as the reference value). Common Processing A can be practiced in this way, however, the compression result after Common Processing A may become common in both state transitions, and it is likely that, for example, Processing 20 may shift to Processing 10 in the middle of process. In order to avoid such a problem, in FIG. 21 (C), confirmation of the current state is performed again after Common Processing A; consequently, it is possible to determine from which state transition of Processing 10 or Processing 20 the processing has started. Therefore, it is possible to manage plural state transitions, making specific procedures such as an MAC verification common.

In using secrecy information, such as encryption unique information 10 stored in the non-volatile memory 3, the MAC verification processing is performed and the existence or nonexistence of falsification is confirmed. In the case where plural confirming processing of such falsification are included in the common processing, if the MAC verification result as illustrated in FIG. 13 is made to reflect in the compression circuit 15 directly, the compression result after the common processing will have variations of the n-th power of 2, where n is the number of times of MAC verification. That is, if PASS or FAIL of the common part, which is provided in association with the common use of the program, is reflected in the compression circuit 15, plural compression results are required, resulting in complicated preparation of the program and in increased program codes. Therefore, the countermeasure for such a problem is desirable.

Figure 22:
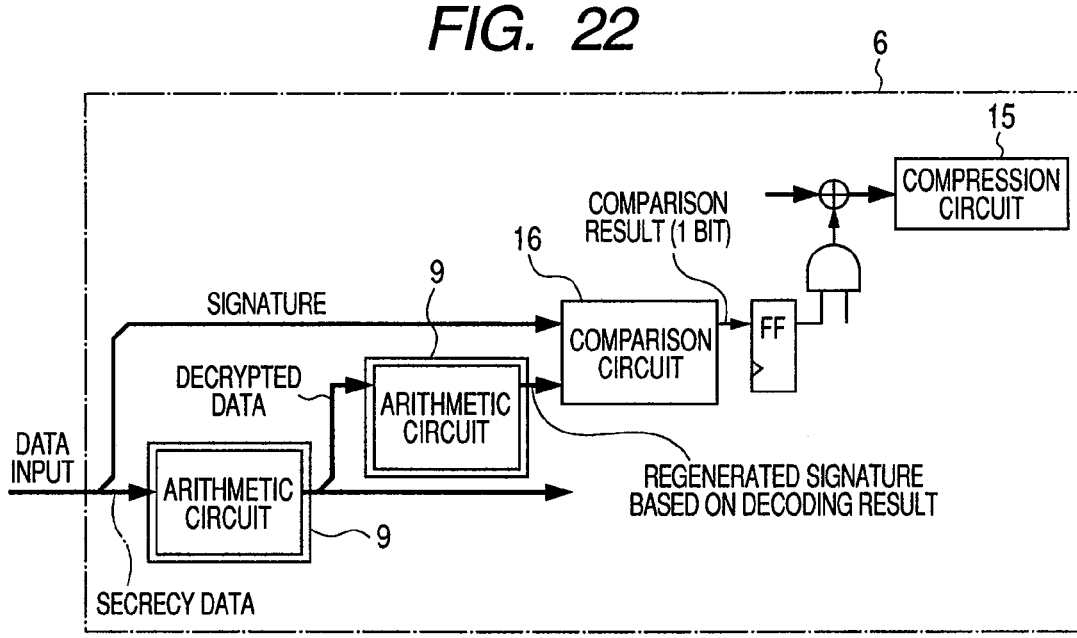
FIG. 22 is a drawing illustrating an error determination method in the common processing, according to the embodiment of the present invention.

FIG. 22 illustrates an error determination method in the common processing. When there are plural parts which perform error determination in the common processing, a binary signature (MAC) verification result (falsification is detected or not detected) is held by a register (flip-flop: FF). Here, it is assumed that when falsification is detected, the verification result is set to "1." Once set, the value of FF is not initialized (to "0"), until it is reflected to the compression circuit 15. Since the output of FF is set to "1" once an error is detected, it becomes possible to adopt a binary for the state by reflecting the output of FF to the compression circuit 15 at the time of the end of the common processing. If the verification result is reflected to the compression circuit 15 at every verification, the processing in the compression circuit 15 becomes complicated. However, the procedure can be easily made common by holding the error determination result not in the compression circuit 15 but in FF, and reflecting the determination result to the compression circuit 15 after the end of the common processing.

Figure 23:
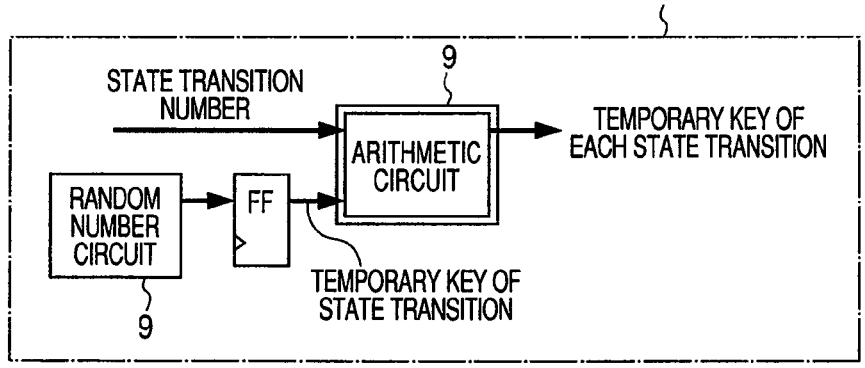
FIG. 23 is a drawing illustrating a method of managing plural states, according to the embodiment of the present invention.

FIG. 23 illustrates a method to manage plural states. When plural state transitions exist, it is necessary to save the temporary keys of number as many as the number of the states; accordingly, the management becomes complicated. As illustrated in FIG. 23, the random number generation function of the encryption/decryption circuit 9 generates a first temporary key common to all the state transitions. On the other hand, a register etc. is prepared as a means to store the state transition number which indicates the state transition to be practiced. The state transition number as many as the number of the state transitions to be managed at the same time is necessary. The first temporary key common to the state transitions and the state transition number are calculated in an arithmetic circuit in the encryption/decryption circuit 9 to generate a second temporary key of the state transition to be practiced.

In this way, the encrypted signal includes the program which controls the security unit 6. In the case where plural state transitions exist in the program, it is possible to reduce the number of the registers for managing keys, by generating the second temporary key of each state transition, from the number assigned to each state transition and the first temporary key which is common to all the state transitions and is generated by a random number.

The embodiment of the present invention can be used for a consumer device treating picture image data, such as DVD, Blue-ray Disc, HD-DVD; a storage product for storing data, such as a hard disk etc.; a network associated equipment, such as VPN (Virtual Private Network); and a microcomputer and ASIC (Application Specific Integrated Circuit), etc. for which safety, such as confidentiality and justification, is required in data processing.

What is claimed is:

1. A data processing apparatus comprising:
a security unit having an encryption means operable to decode an encrypted signal including secrecy data, wherein the security unit includes:
a compression means operable to compress an access signal to be used in accessing the security unit to output the compression result; and
a comparison means operable to compare the compression result outputted by the compression means with a previously-obtained expectation value of the compression result of the access signal,
wherein, when the compression result and the expectation value are different as the result of comparison by the comparison means, one of nullifying output of a signal decrypted by the encryption means and notifying the result of the comparison concerned is performed,
wherein the encrypted signal includes a program to control the security unit, and
wherein, when the program includes a processing accompanied by a conditional branch, a correction value is inputted to the compression means so as to make the compression result same when joined after the conditional branch.

2. The data processing apparatus according to claim 1, wherein the encrypted signal includes the expectation value and the correction value, and the encrypted expectation value and the encrypted correction value are decrypted by the encryption means.

3. The data processing apparatus according to claim 2, wherein initialization of the compression means is performed only at a time of generation of a system key.

4. The data processing apparatus according to claim 3, wherein the system key utilizes unique information of a predetermined device employed by the data processing apparatus at the time of generation of the system key.

5. The data processing apparatus according to claim 4, wherein the secrecy data is decrypted with the use of classification data indicative of a kind of the secrecy data, and the classification data is inputted to the compression means.

6. The data processing apparatus according to claim 5, wherein the secrecy data is decrypted with the use of a group management code capable of distinguishing secrecy data groups of the same purpose, and the group management code is inputted in the compression means.

7. The data processing apparatus according to claim 6, further comprising:
a storage means operable to temporarily store data in the security unit,
wherein, when storing the secrecy data in the storage means, a temporary data unique key is generated from the classification data and a random number, and the secrecy data is encrypted with the use of the temporary data unique key and stored in the storage means.

8. The data processing apparatus according to claim 7, wherein the encrypted signal includes a program to control the security unit, and
wherein, when the program includes a plurality of state transitions, a first temporary key usable in common for all the state transitions is generated from a random number, and a second temporary key usable for each state transition is generated from the first key and a number allotted to each state transition.

9. The data processing apparatus according to claim 8, wherein the compression means and the comparison means are provided with functions of the compression means and the comparison means by hardware, respectively.

* * * * *